US011922954B2

(12) United States Patent
Wang

(10) Patent No.: US 11,922,954 B2
(45) **Date of Patent: *Mar. 5, 2024**

(54) MULTICHANNEL AUDIO SIGNAL PROCESSING METHOD, APPARATUS, AND SYSTEM

(71) Applicant: Huawei Technologies Co., Ltd., Shenzhen (CN)

(72) Inventor: Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 265 days.

This patent is subject to a terminal disclaimer.

(21) Appl. No.: 17/232,679

(22) Filed: Apr. 16, 2021

(65) Prior Publication Data

US 2021/0312932 A1 Oct. 7, 2021

Related U.S. Application Data

(63) Continuation of application No. 16/781,421, filed on Feb. 4, 2020, now Pat. No. 10,984,807, which is a (Continued)

(51) Int. Cl.
*G10L 19/008* (2013.01)
*G10L 19/00* (2013.01)

(Continued)

(52) U.S. Cl.
CPC ............ *G10L 19/008* (2013.01); *G10L 19/00* (2013.01); *G10L 19/012* (2013.01); *H04S 3/008* (2013.01);

(Continued)

(58) Field of Classification Search
CPC ..... G10L 19/24; G10L 19/008; G10L 19/012; G10L 19/002; G10L 19/032; G10L 25/78

(Continued)

(56) References Cited

U.S. PATENT DOCUMENTS 5,687,283 A 11/1997 Wake
6,600,874 B1 7/2003 Fujita et al.

(Continued)

FOREIGN PATENT DOCUMENTS

CN 101320563 A 12/2008
CN 101556799 A 10/2009

(Continued)

OTHER PUBLICATIONS

3GPP TS 26.290 V9.0.0, "3rd Generation Partnership Project; Technical Specification Group Service and System Aspects; Audio codec processing functions; Extended Adaptive Multi-Rate—Wideband (AMR-WB+) codec; Transcoding functions (Release 9)," Sep. 2009, 85 pages.

(Continued)

*Primary Examiner* — Alexander Krzystan
(74) *Attorney, Agent, or Firm* — Conley Rose, P.C.

(57) ABSTRACT

An encoder includes a signal detection circuit and a signal encoding circuit. The signal encoding circuit is configured to encode the $N^{th}$-frame downmixed signal when the signal detection circuit detects that an $N^{th}$-frame downmixed signal includes a speech signal, or when the signal detection circuit detects that the $N^{th}$-frame downmixed signal does not include a speech signal, encode the $N^{th}$-frame downmixed signal when the signal detection circuit determines that the $N^{th}$-frame downmixed signal satisfies a preset audio frame encoding condition, or skip encoding the $N^{th}$-frame downmixed signal when the signal detection circuit determines that the $N^{th}$-frame downmixed signal does not satisfy a preset audio frame encoding condition.

20 Claims, 8 Drawing Sheets

Related U.S. Application Data continuation of application No. 16/368,208, filed on Mar. 28, 2019, now Pat. No. 10,593,339, which is a continuation of application No. PCT/CN2016/100617, filed on Sep. 28, 2016.

(51) Int. Cl.

| | |
|---|---|
| ***G10L 19/012*** | (2013.01) |
| ***H04S 3/00*** | (2006.01) |
| *G10L 19/24* | (2013.01) |
| *G10L 25/78* | (2013.01) |

(52) U.S. Cl.

CPC .............. *G10L 19/24* (2013.01); *G10L 25/78* (2013.01); *H04S 2400/03* (2013.01)

(58) Field of Classification Search

USPC ................................ 381/22, 23, 310; 700/94

See application file for complete search history.

(56) References Cited

U.S. PATENT DOCUMENTS

| | | | | |
|---|---|---|---|---|
| 8,254,404 | B2 * | 8/2012 | Rabenko .................. | H04B 3/23 725/111 |
| 10,593,339 | B2 | 3/2020 | Wang | |
| 2002/0071387 | A1 | 6/2002 | Horiguchi et al. | |
| 2005/0240745 | A1 | 10/2005 | Iyer et al. | |
| 2010/0211400 | A1 | 8/2010 | Oh et al. | |
| 2011/0119061 | A1 | 5/2011 | Brown | |
| 2011/0173005 | A1 | 7/2011 | Hilpert et al. | |
| 2012/0095769 | A1 | 4/2012 | Zhang et al. | |
| 2012/0123775 | A1 * | 5/2012 | Murgia ............... | G10L 21/0364 704/E21.002 |
| 2012/0209600 | A1 * | 8/2012 | Kim ...................... | G10L 19/025 704/E19.048 |
| 2013/0006618 | A1 | 1/2013 | Toguri et al. | |
| 2013/0142340 | A1 | 6/2013 | Sehlstrom et al. | |
| 2013/0223633 | A1 | 8/2013 | Oshikiri et al. | |
| 2014/0126443 | A1 * | 5/2014 | Chizgi .................. | H04W 52/02 370/311 |
| 2014/0330415 | A1 | 11/2014 | Ramo et al. | |
| 2015/0325244 | A1 | 11/2015 | Kim et al. | |
| 2016/0133260 | A1 | 5/2016 | Hatanaka et al. | |
| 2017/0134282 | A1 | 5/2017 | Agarwal et al. | |
| 2018/0233154 | A1 * | 8/2018 | Vaillancourt ........... | G10L 25/03 |
| 2019/0221219 | A1 | 7/2019 | Wang | |

FOREIGN PATENT DOCUMENTS

| | | | |
|---|---|---|---|
| CN | 101661749 | A | 3/2010 |
| CN | 101868821 | A | 10/2010 |
| CN | 103188595 | A | 7/2013 |
| JP | H0713586 | B2 | 2/1995 |
| JP | H08314497 | A | 11/1996 |
| JP | 2008286904 | A | 11/2008 |
| JP | 2013541870 | A | 11/2013 |
| KR | 20070053598 | A | 5/2007 |
| KR | 102387162 | B1 | 4/2022 |
| WO | 9841978 | A1 | 9/1998 |
| WO | 2011114932 | A1 | 9/2011 |
| WO | 2012066727 | A1 | 5/2012 |
| WO | 2014192604 | A1 | 12/2014 |

OTHER PUBLICATIONS

ETSI TS 126 193 V11.0.0, "Digital cellular telecommunications system (Phase 2+); Universal Mobile Telecommunications System (UMTS); LTE; Speech codec speech processing functions; Adaptive Multi-Rate—Wideband (AMR-WB) speech codec; Source controlled rate operation (3GPP TS 26.193 version 11.0.0 Release 11)," Oct. 2012, 23 pages.

ISO/IEC FDIS 23003-3:2011(E), "Information technology—MPEG audio technologies—Part 3: Unified speech and audio coding," ISO/IEC JTC 1/SC 29/WG 11, Sep. 20, 2011, 291 pages.

3GPP TS 26.193 V11.0.0, "3rd Generation Partnership Project; Technical Specification Group Services and System Aspects; Speech codec speech processing functions; Adaptive Multi-Rate—Wideband (AMR-WB) speech codec; Source controlled rate operation (Release 11)," Sep. 2012, 21 pages.

Juergen Herr, MPEG Surround—The ISO/MPEG Standard forEfficient and Compatible Multichannel Audio Coding, Dec. 2008, 25 pages.

* cited by examiner

MULTICHANNEL AUDIO SIGNAL PROCESSING METHOD, APPARATUS, AND SYSTEM

CROSS-REFERENCE TO RELATED APPLICATIONS

This application is a continuation of U.S. patent application Ser. No. 16/781,421, filed on Feb. 4, 2020, now U.S. Pat. No. 10,984,807, which is a continuation of U.S. patent application Ser. No. 16/368,208, filed on Mar. 28, 2019, now U.S. Pat. No. 10,593,339, which is a continuation of International Patent Application No. PCT/CN2016/100617, filed on Sep. 28, 2016. All of the afore-mentioned patent applications are hereby incorporated by reference in their entireties.

TECHNICAL FIELD

The present disclosure relates to the field of audio encoding and decoding technologies, and in particular, to a multichannel audio signal processing method, an apparatus, and a system.

BACKGROUND

During audio communication, to increase a capacity of a communications system, usually, a transmit end first encodes each frame of original audio signal to be transmitted, and then transmits the audio signal. The audio signal is compressed by means of encoding. After receiving the signal, a receive end decodes the received signal, and restores the original audio signal. To implement maximum compression on an audio signal, different types of encoding manners are used for different types of audio signals. In other approaches, when an audio signal is a speech signal, a continuous encoding manner is usually used, that is, each frame of speech signal is encoded, when an audio signal is a noise signal, a discontinuous encoding manner is usually used to encode the noise signal, that is, one frame of noise signal is encoded every several frames of noise signals. For example, a noise signal is encoded every six frames. After the first frame of noise signal is encoded, the second frame of noise signal to the seventh frame of noise signal is not encoded, and the eighth frame of noise signal is encoded. The second frame to the seventh frame is six No_Data frames. Further, the audio signal is a mono audio signal.

With the development of audio communications technologies, an audio communications system further has a special communication manner, stereo communication. That the stereo communication is dual channel communication is used as an example. The two channels include a first channel and a second channel. A transmit end obtains, according to an $n^{th}$-frame speech signal on the first channel and an $n^{th}$-frame speech signal on the second channel, a stereo parameter used to mix the $n^{th}$-frame speech signal on the first channel and the $n^{th}$-frame speech signal on the second channel into one frame of downmixed signal, where the downmixed signal is a mono signal. Then, the transmit end mixes the $n^{th}$-frame speech signals on the two channels into one frame of downmixed signal, where n is a positive integer greater than 0, then encodes the frame of downmixed signal, and finally, sends the encoded downmixed signal and the stereo parameter to a receive end. After receiving the encoded downmixed signal and the stereo parameter, the receive end decodes the encoded downmixed signal, and restores the downmixed signal to a dual channel signal according to the stereo parameter. Compared with a transmission manner in which each frame of speech signal on the two channels is encoded, in this transmission manner, a quantity of transmitted bits is greatly reduced, implementing compression.

However, when a noise signal is transmitted during the stereo communication, if a same encoding manner is used as that for a speech signal, and a discontinuous encoding manner used in mono is directly applied to the stereo communication, the receive end cannot restore the noise signal, leading to poor subjective experience of a user of the receive end.

SUMMARY

The present disclosure provides a multichannel audio signal processing method, an apparatus, and a system, to resolve a problem in the other approaches that an audio signal cannot be discontinuously transmitted in a multichannel audio communications system.

According to a first aspect, a multichannel audio signal processing method is provided, including detecting, by an encoder, whether an $N^{th}$-frame downmixed signal includes a speech signal, and encoding the $N^{th}$-frame downmixed signal when detecting that the $N^{th}$-frame downmixed signal includes the speech signal, or when detecting that the $N^{th}$-frame downmixed signal does not include the speech signal encoding the $N^{th}$-frame downmixed signal if the $N^{th}$-frame downmixed signal satisfies a preset audio frame encoding condition, or skipping encoding the $N^{th}$-frame downmixed signal if the $N^{th}$-frame downmixed signal does not satisfy a preset audio frame encoding condition, where the $N^{th}$-frame downmixed signal is obtained after $N^{th}$-frame audio signals on two of multiple channels are mixed based on a predetermined first algorithm, and N is a positive integer greater than 0.

The encoder encodes the downmixed signal only when the downmixed signal includes the speech signal or the downmixed signal satisfies the preset audio frame encoding condition, otherwise, the encoder does not encode the downmixed signal such that the encoder implements discontinuous encoding on the downmixed signal, and downmixed signal compression efficiency is improved.

It should be noted that in embodiments of the present disclosure, the preset audio frame encoding condition includes a first-frame downmixed signal. That is, when the first-frame downmixed signal does not include the speech signal, but the first-frame downmixed signal satisfies the preset audio frame encoding condition, the first-frame downmixed signal is encoded.

Based on the first aspect, to improve the downmixed signal compression efficiency to a greater extent, optionally, the encoder encodes the $N^{th}$-frame downmixed signal according to a preset speech frame encoding rate when detecting that the $N^{th}$-frame downmixed signal includes the speech signal, or when detecting that the $N^{th}$-frame downmixed signal does not include the speech signal encodes the $N^{th}$-frame downmixed signal according to a preset speech frame encoding rate if determining that the $N^{th}$-frame downmixed signal satisfies a preset speech frame encoding condition, or encodes the $N^{th}$-frame downmixed signal according to a preset silence insertion descriptor (SID) encoding rate if determining that the $N^{th}$-frame downmixed signal does not satisfy a preset speech frame encoding condition, but satisfies a preset SID encoding condition, where the SID encoding rate is less than the speech frame encoding rate.

It should be understood that during specific implementation, if the $N^{th}$-frame downmixed signal does not satisfy the preset speech frame encoding condition, but satisfies the preset SID encoding condition, SID encoding is performed on the $N^{th}$-frame downmixed signal according to the preset SID encoding rate. Compared with speech signal encoding, this further improves the downmixed signal compression efficiency. In addition, it should be noted that in the first aspect and the technical solution, to avoid that a decoder cannot restore the downmixed signal, a stereo parameter set needs to be further encoded.

Based on the first aspect, to further improve compression efficiency of a multichannel communications system, optionally, the encoder performs discontinuous encoding on a stereo parameter set. Further, the encoder obtains an $N^{th}$-frame stereo parameter set according to the $N^{th}$-frame audio signals, and encodes the $N^{th}$-frame stereo parameter set when detecting that the $N^{th}$-frame downmixed signal includes the speech signal, or when detecting that the $N^{th}$-frame downmixed signal does not include the speech signal, if the $N^{th}$-frame stereo parameter set satisfies a preset stereo parameter encoding condition, encodes at least one stereo parameter in the $N^{th}$-frame stereo parameter set, or if determining that the $N^{th}$-frame stereo parameter set does not satisfy a preset stereo parameter encoding condition, skips encoding the stereo parameter set, where the $N^{th}$-frame stereo parameter set includes Z stereo parameters, the Z stereo parameters include a parameter that is used when the encoder mixes the $N^{th}$-frame audio signals based on a predetermined algorithm, and Z is a positive integer greater than 0.

Based on the first aspect, optionally, to further improve the compression efficiency of the multichannel communications system, before the encoding at least one stereo parameter in the $N^{th}$-frame stereo parameter set, the encoder obtains X target stereo parameters according to the Z stereo parameters in the $N^{th}$-frame stereo parameter set based on a preset stereo parameter dimension reduction rule, and then encodes the X target stereo parameters, where X is a positive integer greater than 0 and less than or equal to Z.

The preset stereo parameter dimension reduction rule may be a preset stereo parameter type. That is, the X target stereo parameters satisfying the preset stereo parameter type are selected from the $N^{th}$-frame stereo parameter set. Alternatively, the preset stereo parameter dimension reduction rule is a preset quantity of stereo parameters. That is, the X target stereo parameters are selected from the $N^{th}$-frame stereo parameter set. Alternatively, the preset stereo parameter dimension reduction rule is reducing time-domain or frequency-domain resolution for the at least one stereo parameter in the $N^{th}$-frame stereo parameter set. That is, the X target stereo parameters are determined based on the Z stereo parameters according to reduced time-domain or frequency-domain resolution of the at least one stereo parameter.

Based on the first aspect, optionally, the following method may be further used to improve the compression efficiency of the multichannel communications system, when detecting that the $N^{th}$-frame audio signals include the speech signal the encoder obtains the $N^{th}$-frame stereo parameter set according to the $N^{th}$-frame audio signals based on a first stereo parameter set generation manner, and encodes the $N^{th}$-frame stereo parameter set, or when detecting that the $N^{th}$-frame audio signals do not include the speech signal if the $N^{th}$-frame audio signals satisfy the preset speech frame encoding condition, the encoder obtains the $N^{th}$-frame stereo parameter set according to the $N^{th}$-frame audio signals based on a first stereo parameter set generation manner, and encodes the $N^{th}$-frame stereo parameter set, or if determining that the $N^{th}$-frame audio signals do not satisfy the preset speech frame encoding condition, the encoder obtains the $N^{th}$-frame stereo parameter set according to the $N^{th}$-frame audio signals based on a second stereo parameter set generation manner, and encodes at least one stereo parameter in the $N^{th}$-frame stereo parameter set when the $N^{th}$-frame stereo parameter set satisfies a preset stereo parameter encoding condition, or the encoder does not encode the stereo parameter set when the $N^{th}$-frame stereo parameter set does not satisfy a preset stereo parameter encoding condition, where the first stereo parameter set generation manner and the second stereo parameter set generation manner satisfy at least one of the following conditions a quantity that is of types of stereo parameters included in a stereo parameter set and that is stipulated in the first stereo parameter set generation manner is not less than a quantity that is of types of stereo parameters included in a stereo parameter set and that is stipulated in the second stereo parameter set generation manner, a quantity that is of stereo parameters included in a stereo parameter set and that is stipulated in the first stereo parameter set generation manner is not less than a quantity that is of stereo parameters included in a stereo parameter set and that is stipulated in the second stereo parameter set generation manner, time-domain resolution that is of a stereo parameter and that is stipulated in the first stereo parameter set generation manner is not lower than time-domain resolution that is of a corresponding stereo parameter and that is stipulated in the second stereo parameter set generation manner, or frequency-domain resolution that is of a stereo parameter and that is stipulated in the first stereo parameter set generation manner is not lower than frequency-domain resolution that is of a corresponding stereo parameter and that is stipulated in the second stereo parameter set generation manner.

Based on the first aspect, optionally, when the $N^{th}$-frame downmixed signal includes the speech signal, the encoder encodes the $N^{th}$-frame stereo parameter set according to a first encoding manner, and when the $N^{th}$-frame downmixed signal satisfies the speech frame encoding condition, the encoder encodes at least one stereo parameter in the $N^{th}$-frame stereo parameter set according to the first encoding manner, or when the $N^{th}$-frame downmixed signal does not satisfy the speech frame encoding condition, the encoder encodes the at least one stereo parameter in the $N^{th}$-frame stereo parameter set according to a second encoding manner, where an encoding rate stipulated in the first encoding manner is not less than an encoding rate stipulated in the second encoding manner, and/or for any stereo parameter in the $N^{th}$-frame stereo parameter set, quantization precision stipulated in the first encoding manner is not lower than quantization precision stipulated in the second encoding manner.

For example, the $N^{th}$-frame stereo parameter set includes an inter-channel phase difference (IPD) and an inter-channel time difference (ITD). IPD quantization precision stipulated in the first encoding manner is not lower than IPD quantization precision stipulated in the second encoding manner, and ITD quantization precision stipulated in the first encoding manner is not lower than ITD quantization precision stipulated in the second encoding manner.

Based on the first aspect, optionally, generally, if the at least one stereo parameter in the $N^{th}$-frame stereo parameter set includes an inter-channel level difference (ILD), the preset stereo parameter encoding condition includes $D_L \geq D_0$, where $D_L$ represents a degree by which the ILD deviates from a first standard, the first standard is determined based on a predetermined second algorithm according to T-frame stereo parameter sets preceding the $N^{th}$-frame stereo parameter set, and T is a positive integer greater than 0, if the at least one stereo parameter in the $N^{th}$-frame stereo parameter set includes an ITD, the preset stereo parameter encoding condition includes $D_T \geq D_1$, where $D_T$ represents a degree by which the ITD deviates from a second standard, the second standard is determined based on a predetermined third algorithm according to T-frame stereo parameter sets preceding the $N^{th}$-frame stereo parameter set, and T is a positive integer greater than 0, or if the at least one stereo parameter in the $N^{th}$-frame stereo parameter set includes an IPD, the preset stereo parameter encoding condition includes $D_P \geq D_2$, where $D_P$ represents a degree by which the IPD deviates from a third standard, the third standard is determined based on a predetermined fourth algorithm according to T-frame stereo parameter sets preceding the $N^{th}$-frame stereo parameter set, and T is a positive integer greater than 0.

The second algorithm, the third algorithm, and the fourth algorithm need to be preset according to an actual situation.

Optionally, $D_L$, $D_T$, and $D_P$ respectively satisfy the following expressions:

$$D_L = \sum_{m=0}^{M-1}\left(ILD(m) - \frac{1}{T}\sum_{t=1}^{T} ILD^{[-t]}(m)\right);$$

$$D_T = ITD - \frac{1}{T}\sum_{t=1}^{T} ITD^{[-t]}(m); \text{ and}$$

$$D_P \sum_{m=0}^{M}\left(IPD(m) - \frac{1}{T}\sum_{t=1}^{T} IPD^{[-t]}(m)\right),$$

where ILD(m) is a level difference generated when the $N^{th}$-frame audio signals are respectively transmitted on the two channels in an $m^{th}$ sub frequency band, M is a total quantity of sub frequency bands occupied for transmitting the $N^{th}$-frame audio signals $$\frac{1}{T}\sum_{t=1}^{T} ILD^{[-t]}(m)$$

is an average value of ILDs in the T-frame stereo parameter sets preceding the $N^{th}$-frame stereo parameter set in the $m^{th}$ sub frequency band, T is a positive integer greater than 0, $ILD^{[-t]}(m)$ is a level difference generated when $t^{th}$-frame audio signals preceding the $N^{th}$-frame audio signals are respectively transmitted on the two channels in the $m^{th}$ sub frequency band, the ITD is a time difference generated when the $N^{th}$-frame audio signals are respectively transmitted on the two channels $$\frac{1}{T}\sum_{t=1}^{T} ILD^{[-t]}$$

is an average value of ITDs in the T-frame stereo parameter sets preceding the $N^{th}$-frame stereo parameter set, $ITD^{[-t]}$ is a time difference generated when the t-frame audio signals preceding the $N^{th}$-frame audio signals are respectively transmitted on the two channels, IPD(m) is a phase difference generated when some of the $N^{th}$-frame audio signals are respectively transmitted on the two channels in the $m^{th}$ sub frequency band $$\frac{1}{T}\sum_{t=1}^{T} ILD^{[-t]}(m)$$

is an average value of IPDs in the T-frame stereo parameter sets preceding the $N^{th}$-frame stereo parameter set in the min sub frequency band, and $IPD^{[-t]}(m)$ is a phase difference generated when the $t^{th}$-frame audio signals preceding the $N^{th}$-frame audio signals are respectively transmitted on the two channels in the $m^{th}$ sub frequency band.

According to a second aspect, a multichannel audio signal processing method is provided, including receiving, by a decoder, a bitstream, where the bitstream includes at least two frames, the at least two frames include at least one first-type frame and at least one second-type frame, the first-type frame includes a downmixed signal, and the second-type frame does not include a downmixed signal, and for an $N^{th}$-frame bitstream, where N is a positive integer greater than 1, decoding, by the decoder, the $N^{th}$-frame bitstream if the $N^{th}$-frame bitstream is the first-type frame to obtain an $N^{th}$-frame downmixed signal, or if the $N^{th}$-frame bitstream is the second-type frame, determining, by the decoder according to a preset first rule, m-frame downmixed signals in at least one-frame downmixed signal preceding the $N^{th}$-frame downmixed signal, and obtaining the $N^{th}$-frame downmixed signal according to the m-frame downmixed signals based on a predetermined first algorithm, where m is a positive integer greater than 0, and the $N^{th}$-frame downmixed signal is obtained by an encoder by mixing $N^{th}$-frame audio signals on two of multiple channels based on a predetermined second algorithm.

The bitstream received by the decoder includes the first-type frame and the second-type frame, the first-type frame includes the downmixed signal, and the second-type frame does not include the downmixed signal. That is, the encoder does not encode each frame of downmixed signal. Therefore, discontinuous transmission on the downmixed signal is implemented, and downmixed signal compression efficiency of a multichannel audio communications system is improved.

It should be noted that in embodiments of the present disclosure, the first-frame bitstream is the first-type frame. Further, to restore the obtained downmixed signal to audio signals on the two channels after the first-frame bitstream is decoded, the first-frame bitstream further needs to include a stereo parameter set. Further, because the first-type frame includes the downmixed signal and the second-type frame does not include the downmixed signal, a size of the first-type frame is greater than a size of the second-type frame. The decoder may determine, according to a size of the $N^{th}$-frame bitstream, whether the $N^{th}$-frame bitstream is the first-type frame or the second-type frame. In addition, a flag bit may be further encapsulated in the $N^{th}$-frame bitstream. The decoder partially decodes the $N^{th}$-frame bitstream, to obtain the flag bit. If the flag bit indicates that the $N^{th}$-frame bitstream is the first-type frame, the decoder decodes the $N^{th}$-frame bitstream, to obtain the $N^{th}$-frame downmixed signal. If the flag bit indicates that the $N^{th}$-frame bitstream is the second-type frame, the decoder obtains the $N^{th}$-frame downmixed signal according to the predetermined first algorithm.

Based on the second aspect, to restore the downmixed signal to the audio signals on the two channels, and ensure communication quality of the audio signals, optionally, the first-type frame includes both a downmixed signal and a stereo parameter set, and the second-type frame includes a stereo parameter set, but does not include a downmixed signal, and if the $N^{th}$-frame bitstream is the first-type frame, after decoding the $N^{th}$-frame bitstream, the decoder obtains both the $N^{th}$-frame downmixed signal and an $N^{th}$-frame stereo parameter set, and restores the $N^{th}$-frame downmixed signal to the $N^{th}$-frame audio signals according to at least one stereo parameter in the $N^{th}$-frame stereo parameter set based on a predetermined third algorithm, or if the $N^{th}$-frame bitstream is the second-type frame, the decoder decodes the $N^{th}$-frame bitstream to obtain an $N^{th}$-frame stereo parameter set, and obtains the $N^{th}$-frame downmixed signal based on the predetermined first algorithm. Then, the decoder restores the $N^{th}$-frame downmixed signal to the $N^{th}$-frame audio signals according to the at least one stereo parameter in the $N^{th}$-frame stereo parameter set based on the predetermined third algorithm.

Based on the second aspect, to restore the downmixed signal to the audio signals on the two channels, and ensure communication quality of the audio signals, optionally, the first-type frame includes both a downmixed signal and a stereo parameter set, and the second-type frame includes neither a downmixed signal nor a stereo parameter set, and if the $N^{th}$-frame bitstream is the first-type frame, the decoder decodes the $N^{th}$-frame bitstream to obtain both the $N^{th}$-frame downmixed signal and an $N^{th}$-frame stereo parameter set, and then restores the $N^{th}$-frame downmixed signal to the $N^{th}$-frame audio signals according to at least one stereo parameter in the $N^{th}$-frame stereo parameter set based on a third algorithm, or if the $N^{th}$-frame bitstream is the second-type frame, the decoder obtains the $N^{th}$-frame downmixed signal based on the predetermined first algorithm, determines, according to a preset second rule, k-frame stereo parameter sets in at least one-frame stereo parameter set preceding an $N^{th}$-frame stereo parameter set, obtains the $N^{th}$-frame stereo parameter set according to the k-frame stereo parameter sets based on a predetermined fourth algorithm, and then restores the $N^{th}$-frame downmixed signal to the $N^{th}$-frame audio signals according to at least one stereo parameter in the $N^{th}$-frame stereo parameter set based on a third algorithm, where k is a positive integer greater than 0.

Based on the second aspect, to restore the downmixed signal to the audio signals on the two channels, and ensure communication quality of the audio signals, optionally, the first-type frame includes both a downmixed signal and a stereo parameter set, a third-type frame includes a stereo parameter set, but does not include a downmixed signal, a fourth-type frame includes neither a downmixed signal nor a stereo parameter set, and each of the third-type frame and the fourth-type frame is one case of the second-type frame, and if the $N^{th}$-frame bitstream is the first-type frame, the decoder decodes the $N^{th}$-frame bitstream to obtain both the $N^{th}$-frame downmixed signal and an $N^{th}$-frame stereo parameter set, and restores the $N^{th}$-frame downmixed signal to the $N^{th}$-frame audio signals according to at least one stereo parameter in the $N^{th}$-frame stereo parameter set based on a third algorithm, or if the decoder determines that the $N^{th}$-frame bitstream is the second-type frame, the following two cases are included, when the $N^{th}$-frame bitstream is the third-type frame, the decoder decodes the $N^{th}$-frame bitstream, to obtain an $N^{th}$-frame stereo parameter set, obtains the $N^{th}$-frame downmixed signal based on the predetermined first algorithm, and restores the $N^{th}$-frame downmixed signal to the $N^{th}$-frame audio signals according to at least one stereo parameter in the $N^{th}$-frame stereo parameter set based on a third algorithm, or when the $N^{th}$-frame bitstream is the fourth-type frame, the decoder determines, according to a preset second rule, k-frame stereo parameter sets in at least one-frame stereo parameter set preceding an $N^{th}$-frame stereo parameter set, obtains the $N^{th}$-frame stereo parameter set according to the k-frame stereo parameter sets based on a predetermined fourth algorithm, where k is a positive integer greater than 0, obtains the $N^{th}$-frame downmixed signal based on the predetermined first algorithm, and restores the $N^{th}$-frame downmixed signal to the $N^{th}$-frame audio signals according to at least one stereo parameter in the $N^{th}$-frame stereo parameter set based on a third algorithm.

Based on the second aspect, to restore the downmixed signal to the audio signals on the two channels, and ensure communication quality of the audio signals, optionally, a fifth-type frame includes both a downmixed signal and a stereo parameter set, a sixth-type frame includes a downmixed signal, but does not include a stereo parameter set, each of the fifth-type frame and the sixth-type frame is one case of the first-type frame, and the second-type frame includes neither a downmixed signal nor a stereo parameter set, and if the decoder determines that the $N^{th}$-frame bitstream is the first-type frame, the following two cases are included, when the $N^{th}$-frame bitstream is the fifth-type frame, the decoder decodes the $N^{th}$-frame bitstream, to obtain both the $N^{th}$-frame downmixed signal and an $N^{th}$-frame stereo parameter set, and restores the $N^{th}$-frame downmixed signal to the $N^{th}$-frame audio signals according to at least one stereo parameter in the $N^{th}$-frame stereo parameter set based on a third algorithm, or when the $N^{th}$-frame bitstream is the sixth-type frame, the decoder decodes the $N^{th}$-frame bitstream to obtain the $N^{th}$-frame downmixed signal, determines, according to a preset second rule, k-frame stereo parameter sets in at least one-frame stereo parameter set preceding an $N^{th}$-frame stereo parameter set, obtains the $N^{th}$-frame stereo parameter set according to the k-frame stereo parameter sets based on a predetermined fourth algorithm, and restores the $N^{th}$-frame downmixed signal to the $N^{th}$-frame audio signals according to at least one stereo parameter in the $N^{th}$-frame stereo parameter set based on a third algorithm, or if the $N^{th}$-frame bitstream is the second-type frame, the decoder obtains the $N^{th}$-frame downmixed signal based on the predetermined first algorithm, determines, according to a preset second rule, k-frame stereo parameter sets in at least one-frame stereo parameter set preceding an $N^{th}$-frame stereo parameter set, obtains the $N^{th}$-frame stereo parameter set according to the k-frame stereo parameter sets based on a predetermined fourth algorithm, and restores the $N^{th}$-frame downmixed signal to the $N^{th}$-frame audio signals according to at least one stereo parameter in the $N^{th}$-frame stereo parameter set based on a third algorithm.

Based on the second aspect, to restore the downmixed signal to the audio signals on the two channels, and ensure communication quality of the audio signals, optionally, a fifth-type frame includes both a downmixed signal and a stereo parameter set, a sixth-type frame includes a downmixed signal, but does not include a stereo parameter set, each of the fifth-type frame and the sixth-type frame is one case of the first-type frame, a third-type frame includes a stereo parameter set, but does not include a downmixed signal, a fourth-type frame includes neither a downmixed signal nor a stereo parameter set, and each of the third-type frame and the fourth-type frame is one case of the second-type frame, and if the decoder determines that the $N^{th}$-frame bitstream is the first-type frame, the following two cases are included when the $N^{th}$-frame bitstream is the fifth-type frame, after decoding the $N^{th}$-frame bitstream, the decoder obtains both the $N^{th}$-frame downmixed signal and an $N^{th}$-frame stereo parameter set, and restores the $N^{th}$-frame downmixed signal to the $N^{th}$-frame audio signals according to at least one stereo parameter in the $N^{th}$-frame stereo parameter set based on a third algorithm, or when the $N^{th}$-frame bitstream is the sixth-type frame, after decoding the $N^{th}$-frame bitstream, the decoder obtains the $N^{th}$-frame downmixed signal, determines, according to a preset second rule, k-frame stereo parameter sets in at least one-frame stereo parameter set preceding an $N^{th}$-frame stereo parameter set, obtains the $N^{th}$-frame stereo parameter set according to the k-frame stereo parameter sets based on a predetermined fourth algorithm, and restores the $N^{th}$-frame downmixed signal to the $N^{th}$-frame audio signals according to at least one stereo parameter in the $N^{th}$-frame stereo parameter set based on a third algorithm, or if the decoder determines that the $N^{th}$-frame bitstream is the second-type frame, the following two cases are included, when the $N^{th}$-frame bitstream is the third-type frame, the decoder decodes the $N^{th}$-frame bitstream, to obtain an $N^{th}$-frame stereo parameter set, obtains the $N^{th}$-frame downmixed signal based on the predetermined first algorithm, and restores the $N^{th}$-frame downmixed signal to the $N^{th}$-frame audio signals according to at least one stereo parameter in the $N^{th}$-frame stereo parameter set based on a third algorithm, or when the $N^{th}$-frame bitstream is the fourth-type frame, the decoder determines, according to a preset second rule, k-frame stereo parameter sets in at least one-frame stereo parameter set preceding an $N^{th}$-frame stereo parameter set, obtains the $N^{th}$-frame stereo parameter set according to the k-frame stereo parameter sets based on a predetermined fourth algorithm, where k is a positive integer greater than 0, obtains the $N^{th}$-frame downmixed signal based on the predetermined first algorithm, and restores the $N^{th}$-frame downmixed signal to the $N^{th}$-frame audio signals according to at least one stereo parameter in the $N^{th}$-frame stereo parameter set based on a third algorithm.

According to a third aspect, an encoder is provided, including a signal detection unit and a signal encoding unit. The signal detection unit is configured to detect whether an $N^{th}$-frame downmixed signal includes a speech signal, where the $N^{th}$-frame downmixed signal is obtained after $N^{th}$-frame audio signals on two of multiple channels are mixed based on a predetermined first algorithm, and N is a positive integer greater than 0. The signal encoding unit is configured to encode the $N^{th}$-frame downmixed signal when the signal detection unit detects that the $N^{th}$-frame downmixed signal includes the speech signal, or when the signal detection unit detects that the $N^{th}$-frame downmixed signal does not include the speech signal encode the $N^{th}$-frame downmixed signal if the signal detection unit determines that the $N^{th}$-frame downmixed signal satisfies a preset audio frame encoding condition, or skip encoding the $N^{th}$-frame downmixed signal if the signal detection unit determines that the $N^{th}$-frame downmixed signal does not satisfy a preset audio frame encoding condition.

Based on the third aspect, optionally, the signal encoding unit includes a first signal encoding unit and a second signal encoding unit. When the signal detection unit detects that the $N^{th}$-frame downmixed signal includes the speech signal, the signal detection unit instructs the first signal encoding unit to encode the $N^{th}$-frame downmixed signal. Alternatively, if determining that the $N^{th}$-frame downmixed signal satisfies a preset speech frame encoding condition, the signal detection unit instructs the first signal encoding unit to encode the $N^{th}$-frame downmixed signal. Further, the first signal encoding unit encodes the $N^{th}$-frame downmixed signal according to a preset speech frame encoding rate. If the $N^{th}$-frame downmixed signal does not satisfy a preset speech frame encoding condition, but satisfies a preset SID frame encoding condition, the signal detection unit instructs the second signal encoding unit to encode the $N^{th}$-frame downmixed signal. Further, the second signal encoding unit encodes the $N^{th}$-frame downmixed signal according to a preset SID encoding rate, where the SID encoding rate is not greater than the speech frame encoding rate.

Based on the third aspect, optionally, the encoder further includes a parameter generation unit, a parameter encoding unit, and a parameter detection unit. The parameter generation unit is configured to obtain an $N^{th}$-frame stereo parameter set according to the $N^{th}$-frame audio signals, where the $N^{th}$-frame stereo parameter set includes Z stereo parameters, the Z stereo parameters include a parameter that is used when the encoder mixes the $N^{th}$-frame audio signals based on the predetermined first algorithm, and Z is a positive integer greater than 0. The parameter encoding unit is configured to encode the $N^{th}$-frame stereo parameter set when the signal detection unit detects that the $N^{th}$-frame downmixed signal includes the speech signal, or when the signal detection unit detects that the $N^{th}$-frame downmixed signal does not include the speech signal, encode at least one stereo parameter in the $N^{th}$-frame stereo parameter set if the parameter detection unit determines that the $N^{th}$-frame stereo parameter set satisfies a preset stereo parameter encoding condition, or skip encoding the stereo parameter set if the parameter detection unit determines that the $N^{th}$-frame stereo parameter set does not satisfy a preset stereo parameter encoding condition.

Based on the third aspect, optionally, the parameter encoding unit is configured to obtain X target stereo parameters according to the Z stereo parameters in the $N^{th}$-frame stereo parameter set based on a preset stereo parameter dimension reduction rule, and encode the X target stereo parameters, where X is a positive integer greater than 0 and less than or equal to Z.

Based on the third aspect, optionally, the parameter generation unit includes a first parameter generation unit and a second parameter generation unit, where when the signal detection unit detects that the $N^{th}$-frame audio signals include the speech signal, or when the signal detection unit detects that the $N^{th}$-frame audio signals do not include the speech signal, and the $N^{th}$-frame audio signals satisfy the preset speech frame encoding condition, the signal detection unit instructs the first parameter generation unit to generate an $N^{th}$-frame stereo parameter set, the first parameter generation unit obtains the $N^{th}$-frame stereo parameter set according to the $N^{th}$-frame audio signals based on a first stereo parameter set generation manner, and the parameter encoding unit encodes the $N^{th}$-frame stereo parameter set, when the parameter encoding unit includes a first parameter encoding unit and a second parameter encoding unit, the first parameter encoding unit encodes the $N^{th}$-frame stereo parameter set, where an encoding manner stipulated by the first parameter encoding unit is a first encoding manner, an encoding manner stipulated by the second parameter encoding unit is a second encoding manner, an encoding rate stipulated in the first encoding manner is not less than an encoding rate stipulated in the second encoding manner, and/or, for any stereo parameter in the $N^{th}$-frame stereo parameter set, quantization precision stipulated in the first encoding manner is not lower than quantization precision stipulated in the second encoding manner, and when the signal detection unit detects that the $N^{th}$-frame audio signals do not include the speech signal the second parameter generation unit obtains the $N^{th}$-frame stereo parameter set according to the $N^{th}$-frame audio signals based on a second stereo parameter set generation manner, and when the parameter detection unit determines that the $N^{th}$-frame stereo parameter set satisfies a preset stereo parameter encoding condition, the parameter encoding unit encodes at least one stereo parameter in the $N^{th}$-frame stereo parameter set, and when the parameter encoding unit includes the first parameter encoding unit and the second parameter encoding unit, the second parameter encoding unit encodes the at least one stereo parameter in the $N^{th}$-frame stereo parameter set, or the parameter encoding unit skips encoding the stereo parameter set when the parameter detection unit determines that the $N^{th}$-frame stereo parameter set does not satisfy a preset stereo parameter encoding condition, and the first stereo parameter set generation manner and the second stereo parameter set generation manner satisfy at least one of a quantity that is of types of stereo parameters included in a stereo parameter set and that is stipulated in the first stereo parameter set generation manner is not less than a quantity that is of types of stereo parameters included in a stereo parameter set and that is stipulated in the second stereo parameter set generation manner, a quantity that is of stereo parameters included in a stereo parameter set and that is stipulated in the first stereo parameter set generation manner is not less than a quantity that is of stereo parameters included in a stereo parameter set and that is stipulated in the second stereo parameter set generation manner, time-domain resolution that is of a stereo parameter and that is stipulated in the first stereo parameter set generation manner is not lower than time-domain resolution that is of a corresponding stereo parameter and that is stipulated in the second stereo parameter set generation manner, or frequency-domain resolution that is of a stereo parameter and that is stipulated in the first stereo parameter set generation manner is not lower than frequency-domain resolution that is of a corresponding stereo parameter and that is stipulated in the second stereo parameter set generation manner.

Based on the third aspect, optionally, the parameter encoding unit includes a first parameter encoding unit and a second parameter encoding unit. Further, the first parameter encoding unit is configured to encode the $N^{th}$-frame stereo parameter set according to a first encoding manner when the $N^{th}$-frame downmixed signal includes the speech signal and when the $N^{th}$-frame downmixed signal does not include the speech signal, but satisfies the speech frame encoding condition, and the second parameter encoding unit is configured to encode at least one stereo parameter in the $N^{th}$-frame stereo parameter set according to a second encoding manner when the $N^{th}$-frame downmixed signal does not satisfy the speech frame encoding condition, where an encoding rate stipulated in the first encoding manner is not less than an encoding rate stipulated in the second encoding manner, and/or for any stereo parameter in the $N^{th}$-frame stereo parameter set, quantization precision stipulated in the first encoding manner is not lower than quantization precision stipulated in the second encoding manner.

Based on the third aspect, optionally, if the at least one stereo parameter in the $N^{th}$-frame stereo parameter set includes an ILD, the preset stereo parameter encoding condition includes $D_L \geq D_0$, where $D_L$ represents a degree by which the ILD deviates from a first standard, the first standard is determined based on a predetermined second algorithm according to T-frame stereo parameter sets preceding the $N^{th}$-frame stereo parameter set, and T is a positive integer greater than 0, if the at least one stereo parameter in the $N^{th}$-frame stereo parameter set includes an ITD, the preset stereo parameter encoding condition includes $D_T \geq D_1$, where $D_T$ represents a degree by which the ITD deviates from a second standard, the second standard is determined based on a predetermined third algorithm according to T-frame stereo parameter sets preceding the $N^{th}$-frame stereo parameter set, and T is a positive integer greater than 0, or if the at least one stereo parameter in the $N^{th}$-frame stereo parameter set includes an IPD, the preset stereo parameter encoding condition includes $D_P \geq D_2$, where $D_P$ represents a degree by which the IPD deviates from a third standard, the third standard is determined based on a predetermined fourth algorithm according to T-frame stereo parameter sets preceding the $N^{th}$-frame stereo parameter set, and T is a positive integer greater than 0.

Based on the third aspect, optionally, $D_L$, $D_T$, and $D_P$ respectively satisfy the following expressions:

$$D_L = \sum_{m=0}^{M-1}\left(ILD(m) - \frac{1}{T}\sum_{t=1}^{T} ILD^{[-t]}(m)\right);$$

$$D_T = ITD - \frac{1}{T}\sum_{t=1}^{T} ITD^{[-t]}(m); \text{ and}$$

$$D_P \sum_{m=0}^{M}\left(IPD(m) - \frac{1}{T}\sum_{t=1}^{T} IPD^{[-t]}(m)\right),$$

where ILD(m) is a level difference generated when the $N^{th}$-frame audio signals are respectively transmitted on the two channels in an $m^{th}$ sub frequency band. M is a total quantity of sub frequency bands occupied for transmitting the $N^{th}$-frame audio signals $$\frac{1}{T}\sum_{t=1}^{T} ILD^{[-t]}(m)$$

is an average value of ILDs in the T-frame stereo parameter sets preceding the $N^{th}$-frame stereo parameter set in the $m^{th}$ sub frequency band, T is a positive integer greater than 0, $ILD^{[-t]}(m)$ is a level difference generated when $t^{th}$-frame audio signals preceding the $N^{th}$-frame audio signals are respectively transmitted on the two channels in the $m^{th}$ sub frequency band, the ITD is a time difference generated when the $N^{th}$-frame audio signals are respectively transmitted on the two channels $$\frac{1}{T}\sum_{t=1}^{T} ILD^{[-t]}$$

is an average value of ITDs in the T-frame stereo parameter sets preceding the $N^{th}$-frame stereo parameter set, $ITD^{[-t]}$ is a time difference generated when the $t^{th}$-frame audio signals preceding the $N^{th}$-frame audio signals are respectively transmitted on the two channels. IPD(m) is a phase difference generated when some of the $N^{th}$-frame audio signals are respectively transmitted on the two channels in the $m^{th}$ sub frequency band $$\frac{1}{T}\sum_{t=1}^{T} ILD^{[-t]}(m)$$

is an average value of IPDs in the T-frame stereo parameter sets preceding the $N^{th}$-frame stereo parameter set in the min sub frequency band, and $IPD^{[-t]}(m)$ is a phase difference generated when the $t^{th}$-frame audio signals preceding the $N^{th}$-frame audio signals are respectively transmitted on the two channels in the $m^{th}$ sub frequency band.

According to a fourth aspect, a decoder is provided, including a receiving unit and a decoding unit. The receiving unit is configured to receive a bitstream, where the bitstream includes at least two frames, the at least two frames include at least one first-type frame and at least one second-type frame, the first-type frame includes a downmixed signal, and the second-type frame does not include a downmixed signal, and the decoding unit is configured to for an $N^{th}$-frame bitstream, where N is a positive integer greater than 1, decode the $N^{th}$-frame bitstream if the $N^{th}$-frame bitstream is the first-type frame, to obtain an $N^{th}$-frame downmixed signal, or if the $N^{th}$-frame bitstream is the second-type frame, determine, according to a preset first rule, m-frame downmixed signals in at least one-frame downmixed signal preceding an $N^{th}$-frame downmixed signal, and obtain the $N^{th}$-frame downmixed signal according to the m-frame downmixed signals based on a predetermined first algorithm, where m is a positive integer greater than 0, and the $N^{th}$-frame downmixed signal is obtained by an encoder by mixing $N^{th}$-frame audio signals on two of multiple channels based on a predetermined second algorithm.

Based on the fourth aspect, optionally, the first-type frame includes both a downmixed signal and a stereo parameter set, and the second-type frame includes a stereo parameter set, but does not include a downmixed signal, the decoding unit is further configured to if the $N^{th}$-frame bitstream is the first-type frame, decode the $N^{th}$-frame bitstream, to obtain both the $N^{th}$-frame downmixed signal and an $N^{th}$-frame stereo parameter set, or if the $N^{th}$-frame bitstream is the second-type frame, decode the $N^{th}$-frame bitstream, to obtain an $N^{th}$-frame stereo parameter set, where at least one stereo parameter in the $N^{th}$-frame stereo parameter set is used by the decoder to restore the $N^{th}$-frame downmixed signal to the $N^{th}$-frame audio signals based on a predetermined third algorithm, and a signal restoration unit is configured to restore the $N^{th}$-frame downmixed signal to the $N^{th}$-frame audio signals according to the at least one stereo parameter in the $N^{th}$-frame stereo parameter set based on the third algorithm.

Based on the fourth aspect, optionally, the first-type frame includes both a downmixed signal and a stereo parameter set, and the second-type frame includes neither a downmixed signal nor a stereo parameter set, the decoding unit is further configured to if the $N^{th}$-frame bitstream is the first-type frame, decode the $N^{th}$-frame bitstream, to obtain both the $N^{th}$-frame downmixed signal and an $N^{th}$-frame stereo parameter set, or if the $N^{th}$-frame bitstream is the second-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, where k is a positive integer greater than 0, and at least one stereo parameter in the $N^{th}$-frame stereo parameter set is used by the decoder to restore the $N^{th}$-frame downmixed signal to the $N^{th}$-frame audio signals based on a predetermined third algorithm, and a signal restoration unit is configured to restore the $N^{th}$-frame downmixed signal to the $N^{th}$-frame audio signals according to the at least one stereo parameter in the $N^{th}$-frame stereo parameter set based on the third algorithm.

Based on the fourth aspect, optionally, the first-type frame includes both a downmixed signal and a stereo parameter set, a third-type frame includes a stereo parameter set, but does not include a downmixed signal, a fourth-type frame includes neither a downmixed signal nor a stereo parameter set, and each of the third-type frame and the fourth-type frame is one case of the second-type frame, the decoding unit is further configured to, if the $N^{th}$-frame bitstream is the first-type frame, decode the $N^{th}$-frame bitstream to obtain both the $N^{th}$-frame downmixed signal and an $N^{th}$-frame stereo parameter set, or if the $N^{th}$-frame bitstream is the second-type frame, when the $N^{th}$-frame bitstream is the third-type frame, decode the $N^{th}$-frame bitstream to obtain an $N^{th}$-frame stereo parameter set, or when the $N^{th}$-frame bitstream is the fourth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, where k is a positive integer greater than 0, and at least one stereo parameter in the $N^{th}$-frame stereo parameter set is used by the decoder to restore the $N^{th}$-frame downmixed signal to the $N^{th}$-frame audio signals based on a predetermined third algorithm, and a signal restoration unit is configured to restore the $N^{th}$-frame downmixed signal to the $N^{th}$-frame audio signals according to the at least one stereo parameter in the $N^{th}$-frame stereo parameter set based on the third algorithm.

Based on the fourth aspect, optionally, a fifth-type frame includes both a downmixed signal and a stereo parameter set, a sixth-type frame includes a downmixed signal, but does not include a stereo parameter set, each of the fifth-type frame and the sixth-type frame is one case of the first-type frame, and the second-type frame includes neither a downmixed signal nor a stereo parameter set, the decoding unit is further configured to, if the $N^{th}$-frame bitstream is the first-type frame, when the $N^{th}$-frame bitstream is the fifth-type frame, decode the $N^{th}$-frame bitstream, to obtain both the $N^{th}$-frame downmixed signal and an $N^{th}$-frame stereo parameter set, or when the $N^{th}$-frame bitstream is the sixth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, or if the $N^{th}$-frame bitstream is the second-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, where at least one stereo parameter in the $N^{th}$-frame stereo parameter set is used by the decoder to restore the $N^{th}$-frame downmixed signal to the $N^{th}$-frame audio signals based on a predetermined third algorithm, and k is a positive integer greater than 0, and a signal restoration unit is configured to restore the $N^{th}$-frame downmixed signal to the $N^{th}$-frame audio signals according to the at least one stereo parameter in the $N^{th}$-frame stereo parameter set based on the third algorithm.

Based on the fourth aspect, optionally, a fifth-type frame includes both a downmixed signal and a stereo parameter set, a sixth-type frame includes a downmixed signal, but does not include a stereo parameter set, each of the fifth-type frame and the sixth-type frame is one case of the first-type frame, a third-type frame includes a stereo parameter set, but does not include a downmixed signal, a fourth-type frame includes neither a downmixed signal nor a stereo parameter set, and each of the third-type frame and the fourth-type frame is one case of the second-type frame, the decoding unit is further configured to, if the $N^{th}$-frame bitstream is the first-type frame, when the $N^{th}$-frame bitstream is the fifth-type frame, decode the $N^{th}$-frame bitstream, to obtain both the $N^{th}$-frame downmixed signal and an $N^{th}$-frame stereo parameter set, or when the $N^{th}$-frame bitstream is the sixth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, or the decoding unit is further configured to, if the $N^{th}$-frame bitstream is the second-type frame, when the $N^{th}$-frame bitstream is the third-type frame, decode the $N^{th}$-frame bitstream, to obtain an $N^{th}$-frame stereo parameter set, or when the $N^{th}$-frame bitstream is the fourth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, where at least one stereo parameter in the $N^{th}$-frame stereo parameter set is used by the decoder to restore the $N^{th}$-frame downmixed signal to the $N^{th}$-frame audio signals based on a predetermined third algorithm, and k is a positive integer greater than 0, and the decoder further includes a signal restoration unit, where the signal restoration unit is configured to restore the $N^{th}$-frame downmixed signal to the $N^{th}$-frame audio signals according to the at least one stereo parameter in the $N^{th}$-frame stereo parameter set based on the third algorithm.

According to a fifth aspect, an encoding and decoding system is provided, including any encoder provided in the third aspect and any decoder provided in the fourth aspect.

According to a sixth aspect, an embodiment of the present disclosure further provides a terminal device. The terminal device includes a processor and a memory. The memory is configured to store a software program, and the processor is configured to read the software program stored in the memory and implement the method provided in the first aspect or any implementation of the first aspect.

According to a seventh aspect, an embodiment of the present disclosure further provides a computer storage medium. The storage medium may be non-volatile. That is, content is not lost after power-off. The storage medium stores a software program, and when the software program is read and executed by one or more processors, the method provided in the first aspect or any implementation of the first aspect can be implemented.

DESCRIPTION OF EMBODIMENTS

Figure 1:
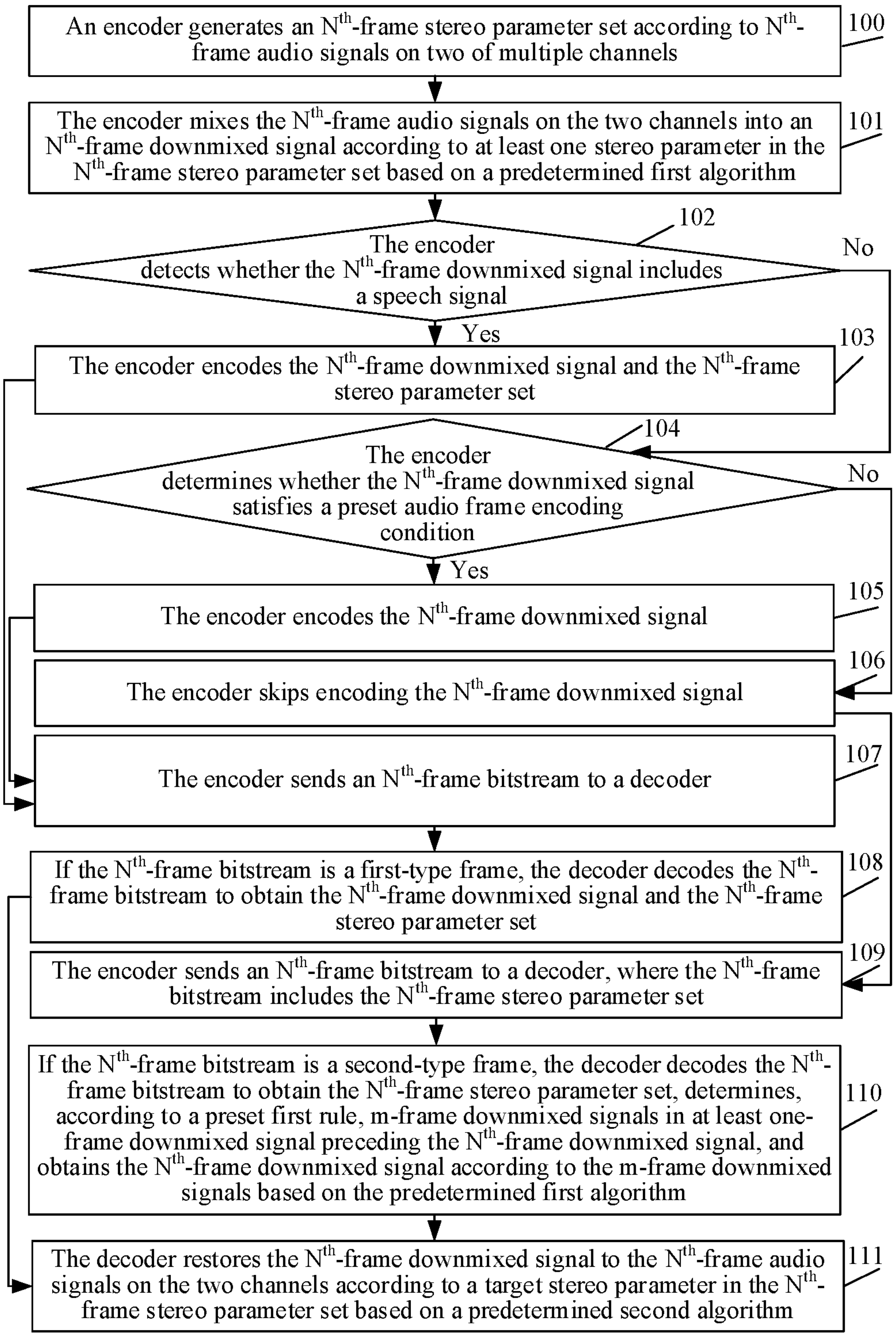
FIG. 1 is a schematic flowchart of a multichannel audio signal processing method according to Embodiment 1 of the present disclosure.

To make the objectives, technical solutions, and advantages of the present disclosure clearer, the following further describes the present disclosure in detail with reference to the accompanying drawings.

It should be understood that, in an audio encoding and decoding technology, an audio signal is encoded or decoded in a unit of frame. Further, an $N^{th}$-frame audio signal is an $N^{th}$ audio frame. When the $N^{th}$-frame audio signal includes a speech signal, the $N^{th}$ audio frame is a speech frame. When the $N^{th}$-frame audio frame does not include a speech signal, but includes a background noise signal, the $N^{th}$ audio frame is a noise frame. Herein, N is a positive integer greater than 0.

In addition, in a mono communications system, when a discontinuous encoding manner is used, encoding is performed once every several noise frames to obtain a SID frame.

An encoder and a decoder in the embodiments of the present disclosure are packages used to process a multichannel audio signal. The packages may be installed on a device supporting multichannel audio signal processing, such as a terminal (for example, a mobile phone, a notebook computer, or a tablet computer), or a server such that the device such as the terminal or the server has a function of processing the multichannel audio signal in the embodiments of the present disclosure.

In the embodiments of the present disclosure, because an audio signal can be encoded using a discontinuous encoding mechanism in a multichannel communications system, audio signal compression efficiency of is greatly improved.

The following describes in detail a multichannel audio signal processing method in the embodiments of the present disclosure using an $N^{th}$-frame downmixed signal as an example, and N is a positive integer greater than 0. It is assumed that the $N^{th}$-frame downmixed signal is obtained after $N^{th}$-frame audio signals on two of multiple channels are mixed.

When the multiple channels are two channels, and the two channels are respectively a first channel and a second channel, the two of the multiple channels are the first channel and the second channel, and an $N^{th}$-frame downmixed signal is obtained by mixing an $N^{th}$-frame audio signal on the first channel and an $N^{th}$-frame audio signal on the second channel. When the multiple channels are at least three channels, a downmixed signal is obtained by mixing audio signals on two paired channels in the multiple channels. Further, three channels are used as an example, and the three channels are a first channel, a second channel, and a third channel. Assuming that only the first channel and the second channel are paired according to a specified rule, the two of the multiple channels are the first channel and the second channel, and an $N^{th}$-frame downmixed signal is obtained after downmixing is performed on an $N^{th}$-frame audio signal on the first channel and an $N^{th}$-frame audio signal on the second channel. Assuming that, in the three channels, the first channel and the second channel are paired and the second channel and the third channel are paired, the two of the multiple channels may be the first channel and the second channel, or may be the second channel and the third channel.

As shown in FIG. 1, a multichannel audio signal processing method in Embodiment 1 of the present disclosure includes the following steps.

Step 100: An encoder generates an $N^{th}$-frame stereo parameter set according to $N^{th}$-frame audio signals on two of multiple channels, where the stereo parameter set includes Z stereo parameters.

Further, the Z stereo parameters include a parameter that is used when the encoder mixes the $N^{th}$-frame audio signals based on a predetermined first algorithm, and Z is a positive integer greater than 0. It should be understood that the predetermined first algorithm is a downmixed signal generation algorithm preset in the encoder.

It should be noted that stereo parameters included in the $N^{th}$-frame stereo parameter set are determined using a preset stereo parameter generation algorithm. Assuming that one of the two channels is a left channel, and the other is a right channel, the preset stereo parameter generation algorithm is as follows, and a stereo parameter obtained according to the $N^{th}$-frame audio signals $$PL(i) = \mathrm{Re}L(i)^2 + \mathrm{Im}L(i)^2 \quad i = 1, 2, \ldots, \frac{N}{2} - 2,$$

$$PR(i) = \mathrm{Re}R(i)^2 + \mathrm{Im}R(i)^2 \quad i = 1, 2, \ldots, \frac{N}{2} - 2,$$

$$EL(m) = \sum_{i=bl(m)}^{bh(m)} PL(i) \quad m = 0, 1, \ldots, M-1,$$

$$ER(m) = \sum_{i=bl(m)}^{bh(m)} PR(i) \quad m = 0, 1, \ldots, M-1, \text{ and}$$

$$ILD(m) = 10 \cdot \log\left(\frac{EL(m)}{ER(m)}\right) \quad m = 0, 1 \ldots, M-1,$$

where L(i) is a discrete Fourier transform (DFT) coefficient of an $N^{th}$-frame audio signal on the left channel in an $i^{th}$ frequency bin, R(i) is a DFT coefficient of an $N^{th}$-frame audio signal on the right channel in the $i^{th}$ frequency bin, Re L(i) is a real part of L(i), Im L(i) is an imaginary part of L(i), ReR(i) is a real part of R(i), ImR(i) is an imaginary part of R(i), PL(i) is an energy spectrum of the $N^{th}$-frame audio signal on the left channel in the $i^{th}$ frequency bin, PR(i) is an energy spectrum of the $N^{th}$-frame audio signal on the right channel in the $i^{th}$ frequency bin, EL(m) is energy of an $N^{th}$-frame audio signal in an $m^{th}$ sub frequency band of the left channel. ER(m) is energy of an $N^{th}$-frame audio signal in an $m^{th}$ sub frequency band of the right channel, and a total quantity of sub frequency bands for transmitting the $N^{th}$-frame audio signals is M.

In the stereo parameter generation algorithm, a case in which the $N^{th}$-frame audio signal is a direct component or a Nyquist component respectively in frequency bins i=0 or $$i = \frac{N}{2} - 1$$

is not considered.

When the preset stereo parameter generation algorithm further includes an algorithm for calculating other stereo parameters such as an ITD, an IPD, and inter-channel coherence (IC), the encoder can further obtain the stereo parameters such as the ITD, the IPD, and the IC according to the audio signal based on the preset stereo parameter generation algorithm.

It should be understood that the $N^{th}$-frame stereo parameter set includes at least one stereo parameter. For example, the IPD, the ITD, the ILD, and the IC are obtained according to the $N^{th}$-frame audio signals on the two channels based on the preset stereo parameter generation algorithm, and the IPD, the ITD, the ILD, and the IC form the $N^{th}$-frame stereo parameter set.

Step 101: The encoder mixes the $N^{th}$-frame audio signals on the two channels into an $N^{th}$-frame downmixed signal according to at least one stereo parameter in the $N^{th}$-frame stereo parameter set based on a predetermined first algorithm.

For example, the $N^{th}$-frame stereo parameter set includes the ITD, the ILD, the IPD, and the IC. The $N^{th}$-frame downmixed signal is obtained according to the ILD and the IPD based on the predetermined first algorithm. Further, the $N^{th}$-frame downmixed signal DMX(k) satisfies the following expression in a $k^{th}$ frequency bin:

$$DMX(k) = \frac{|L(k)| + |R(k)|}{2} e^{j\left(\angle L(k) \frac{IPD(k)}{1+10^{(LD(k_{1/2}}}\right)} k = 0, 1, \ldots, \frac{N}{2},$$

where DMX(k) represents the $N^{th}$-frame downmixed signal in the $k^{th}$ frequency bin, |L(k)| represents an amplitude of an $N^{th}$-frame audio signal on a left channel in a $K^{th}$ pair of channels in the $k^{th}$ frequency bin. |R(k)| represents an amplitude of an $N^{th}$-frame audio signal on a right channel in the $K^{th}$ pair of channels in the $k^{th}$ frequency bin, ∠L(k) represents a phase angle of the $N^{th}$-frame audio signal on the left channel in the $k^{th}$ frequency bin, ILD(k) represents an ILD of the $N^{th}$-frame audio signals in the $k^{th}$ frequency bin, and IPD(k) represents an IPD of the $N^{th}$-frame audio signals in the $k^{th}$ frequency bin.

It should be noted that in addition to the algorithm for obtaining the downmixed signal, this embodiment of the present disclosure imposes no limitation on another algorithm for obtaining the downmixed signal.

In Embodiment 1 of the present disclosure, the $N^{th}$-frame stereo parameter set is encoded such that a decoder can restore the $N^{th}$-frame downmixed signal. Optionally, to improve compression efficiency during encoding, the encoder encodes a stereo parameter used for obtaining the $N^{th}$-frame downmixed signal in the $N^{th}$-frame stereo parameter set. For example, the generated $N^{th}$-frame stereo parameter set includes the ITD, the ILD, the IPD, and the IC. If the encoder mixes the $N^{th}$-frame audio signals on the two channels into the $N^{th}$-frame downmixed signal according to only the ILD and the IPD in the $N^{th}$-frame stereo parameter set based on the predetermined first algorithm, to improve the compression efficiency, the encoder may encode only the ILD and the IPD in the $N^{th}$-frame stereo parameter set.

Step 102: The encoder detects whether the $N^{th}$-frame downmixed signal includes a speech signal, and if the $N^{th}$-frame downmixed signal includes the speech signal, performs step 103, or if the $N^{th}$-frame downmixed signal does not include the speech signal, performs step 104.

For ease of detecting, by the encoder, whether the $N^{th}$-frame downmixed signal includes the speech signal, optionally, the encoder directly detects, by means of voice activity detection (VAD), whether the $N^{th}$-frame downmixed signal includes the speech signal.

Optionally, a method for indirectly detecting, by the encoder, whether the $N^{th}$-fame downmixed signal includes the speech signal includes that the encoder directly detects, by means of VAD, whether the $N^{th}$-frame audio signals include the speech signal. Further, if detecting that an audio signal on one of the two channels includes the speech signal, the encoder determines that a downmixed signal obtained by mixing audio signals on the two channels includes the speech signal. Only when neither of the audio signals on the two channels includes the speech signal, the encoder determines that the downmixed signal obtained by mixing the audio signals on the two channels does not include the speech signal. It should be noted that in such an indirect detection manner, a sequence between step 102 and step 100 or step 101 is not limited, provided that step 100 precedes step 101.

Step 103: The encoder encodes the $N^{th}$-frame downmixed signal, and performs step 107.

The encoder encodes the $N^{th}$-frame downmixed signal to obtain an $N^{th}$-frame bitstream.

Because discontinuous encoding is performed on the downmixed signal in Embodiment 1 of the present disclosure, a bitstream includes two frame types a first-type frame and a second-type frame. The first-type frame includes a downmixed signal, and the second-type frame does not include a downmixed signal. The $N^{th}$-frame bitstream obtained in step 103 is the first-type frame.

In step 103, because the $N^{th}$-frame downmixed signal includes the speech signal, optionally, the encoder encodes the $N^{th}$-frame downmixed signal according to a preset speech frame encoding rate. The preset speech frame encoding rate may be set to 13.2 kilobits per second (kbps).

In addition, optionally, if encoding the $N^{th}$-frame downmixed signal, the encoder encodes the $N^{th}$-frame stereo parameter set.

Step 104: The encoder determines whether the $N^{th}$-frame downmixed signal satisfies a preset audio frame encoding condition, and if the $N^{th}$-frame downmixed signal satisfies the preset audio frame encoding condition, performs step 105, or if the $N^{th}$-frame downmixed signal does not satisfy the preset audio frame encoding condition, performs step 106.

The preset audio frame encoding condition is a condition that is preconfigured in the encoder and that is used to determine whether to encode the $N^{th}$-frame downmixed signal.

It should be noted that for a first-frame downmixed signal, if the first-frame downmixed signal does not include the speech signal, the first-frame downmixed signal satisfies the preset audio frame encoding condition. That is, the first-frame downmixed signal is encoded regardless of whether the first-frame downmixed signal includes the speech signal.

Step 105: The encoder encodes the $N^{th}$-frame downmixed signal, and performs step 107.

Further, the $N^{th}$-frame bitstream obtained in step 105 is also the first-type frame.

It should be noted that, optionally, if encoding the $N^{th}$-frame downmixed signal, the encoder encodes the $N^{th}$-frame stereo parameter set.

Optionally, for ease of simplifying an implementation of encoding the downmixed signal, in Embodiment 1 of the present disclosure, the $N^{th}$-frame downmixed signal is encoded in a same manner in step 103 and step 105.

Optionally, because the $N^{th}$-frame downmixed signal in step 105 does not include the speech signal, when the $N^{th}$-frame downmixed signal satisfies a preset speech frame encoding condition, the encoder encodes the $N^{th}$-frame downmixed signal according to the preset speech frame encoding rate. Alternatively, when the $N^{th}$-frame downmixed signal does not satisfy a preset speech frame encoding condition, but satisfies a preset SID encoding condition, the encoder encodes the $N^{th}$-frame downmixed signal according to a preset SID encoding rate. The preset SID encoding rate may be set to 2.8 kbps.

It should be noted that when the $N^{th}$-frame downmixed signal does not satisfy the preset speech frame encoding condition, but satisfies the preset SID encoding condition, the encoder encodes the $N^{th}$-frame downmixed signal according to an SID encoding manner. The SID encoding manner stipulates that an encoding rate is the preset SID encoding rate, and stipulates an algorithm used for the encoding and a parameter used for the encoding.

The preset speech frame encoding condition may be duration between the $N^{th}$-frame downmixed signal and an $M^{th}$-frame downmixed signal is not greater than preset duration. The $M^{th}$-frame downmixed signal includes the speech signal, and the $M^{th}$-frame downmixed signal is a frame of downmixed signal that includes the speech signal and that is closest to the $N^{th}$-frame downmixed signal. The preset SID encoding condition may be encoding an odd-number frame. When N of the $N^{th}$-frame downmixed signal is an odd number, the encoder determines that the $N^{th}$-frame downmixed signal satisfies the preset SID encoding condition.

Step 106: The encoder skips encoding the $N^{th}$-frame downmixed signal, and performs step 109.

Further, the $N^{th}$-frame bitstream obtained in step 106 is the second-type frame.

The encoder determines that the $N^{th}$-frame downmixed signal does not satisfy the preset audio frame encoding condition. Further, the encoder determines that the $N^{th}$-frame downmixed signal does not satisfy the preset speech frame encoding condition, and does not satisfy the preset SID encoding condition.

In this embodiment of the present disclosure, the encoder does not encode the $N^{th}$-frame downmixed signal. Further, the $N^{th}$-frame bitstream does not include the $N^{th}$-frame downmixed signal.

When the encoder does not encode the $N^{th}$-frame downmixed signal, the encoder may encode the $N^{th}$-frame stereo parameter set, or may not encode the $N^{th}$-frame stereo parameter set.

In Embodiment 1 of the present disclosure, a description is made using an example in which the encoder does not encode the $N^{th}$-frame downmixed signal, but encodes the $N^{th}$-frame stereo parameter set. However, optionally, when the encoder does not encode the $N^{th}$-frame downmixed signal, the encoder may not encode the $N^{th}$-frame stereo parameter set either. Further, when the encoder encodes neither the $N^{th}$-frame stereo parameter set nor the $N^{th}$-frame downmixed signal, for a manner of obtaining the $N^{th}$-frame downmixed signal and the $N^{th}$-frame stereo parameter set by the decoder, refer to Embodiment 2 of the present disclosure.

Step 107: The encoder sends an $N^{th}$-frame bitstream to a decoder.

In order that the decoder can restore the $N^{th}$-frame downmixed signal to the $N^{th}$-frame audio signals on the two channels after obtaining, by means of decoding, the $N^{th}$- frame downmixed signal, the $N^{th}$-frame bitstream includes both the $N^{th}$-frame stereo parameter set and the $N^{th}$-frame downmixed signal.

Step 108: If the $N^{th}$-frame bitstream is a first-type frame, the decoder decodes the $N^{th}$-frame bitstream to obtain the $N^{th}$-frame downmixed signal and the $N^{th}$-frame stereo parameter set, and performs step 111.

It should be noted that, because the first-type frame includes a downmixed signal and the second-type frame does not include a downmixed signal, a size of the first-type frame is greater than a size of the second-type frame. The decoder may determine, according to a size of the $N^{th}$-frame bitstream, whether the $N^{th}$-frame bitstream is the first-type frame or the second-type frame. In addition, optionally, a flag bit may be further encapsulated in the $N^{th}$-frame bitstream. The decoder partially decodes the $N^{th}$-frame bitstream to obtain the flag bit, and determines, according to the flag bit, whether the $N^{th}$-frame bitstream is the first-type frame or the second-type frame. For example, when the flag bit is 1, it indicates that the $N^{th}$-frame bitstream is the first-type frame, when the flag bit is 0, it indicates that the $N^{th}$-frame bitstream is the second-type frame.

In addition, optionally, the decoder determines a decoding manner according to a rate corresponding to the $N^{th}$-frame bitstream. For example, if the rate of the $N^{th}$-frame bitstream is 17.4 kbps, a rate of a bitstream corresponding to a downmixed signal is 13.2 kbps, and a rate of a bitstream corresponding to a stereo parameter set is 4.2 kbps, the decoder decodes, according to a decoding manner corresponding to 13.2 kbps, the bitstream corresponding to the downmixed signal, and decodes, according to a decoding manner corresponding to 4.2 kbps, the bitstream corresponding to the stereo parameter set.

Alternatively, the decoder determines an encoding manner of the $N^{th}$-frame bitstream according to an encoding manner flag bit in the $N^{th}$-frame bitstream, and decodes the $N^{th}$-frame bitstream according to a decoding manner corresponding to the encoding manner.

Step 109: The encoder sends an $N^{th}$-frame bitstream to a decoder, where the $N^{th}$-frame bitstream includes the $N^{th}$-frame stereo parameter set.

Step 110: If the Nth-frame bitstream is a second-type frame, the decoder decodes the Nth-frame bitstream to obtain the Nth-frame stereo parameter set, determines, according to a preset first rule, m-frame downmixed signals in at least one-frame downmixed signal preceding the Nth-frame downmixed signal, and obtains the Nth-frame downmixed signal according to the m-frame downmixed signals based on the predetermined first algorithm, where m is a positive integer greater than 0.

Further, an average value of an $(N-3)^{th}$-frame downmixed signal, an $(N-2)^{th}$-frame downmixed signal, and an $(N-1)^{th}$-frame downmixed signal is used as the $N^{th}$-frame downmixed signal, or an $(N-1)^{th}$-frame downmixed signal is directly used as the $N^{th}$-frame downmixed signal, or the $N^{th}$-frame downmixed signal is estimated according to another algorithm.

In addition, the $(N-1)^{th}$-frame downmixed signal may be directly used as the $N^{th}$-frame downmixed signal, or the $N^{th}$-frame downmixed signal is calculated according to the $(N-1)^{th}$-frame downmixed signal and a preset offset value based on a preset algorithm.

Step 111: The decoder restores the $N^{th}$-frame downmixed signal to the $N^{th}$-frame audio signals on the two channels according to a target stereo parameter in the $N^{th}$-frame stereo parameter set based on a predetermined second algorithm.

It should be understood that the target stereo parameter is at least one stereo parameter in the $N^{th}$-frame stereo parameter set.

Further, a process of restoring, by the decoder, the $N^{th}$-frame downmixed signal to the $N^{th}$-frame audio signals on the two channels is an inverse process of mixing, by the encoder, the $N^{th}$-frame audio signals on the two channels into the $N^{th}$-frame downmixed signal. Assuming that the encoder obtains the $N^{th}$-frame downmixed signal according to the IPD and the ILD in the $N^{th}$-frame stereo parameter set, the decoder restores the $N^{th}$-frame downmixed signal to $N^{th}$-frame signals on the channels in the $K^{th}$ pair of channels according to the IPD and the ILD in the $N^{th}$-frame stereo parameter set. In addition, it should be noted that an algorithm that is preset in the decoder and that is used to restore a downmixed signal may be an inverse algorithm of a downmixed signal generation algorithm in the encoder, or may be an algorithm independent of a downmixed signal generation algorithm in the encoder.

Figure 2A:
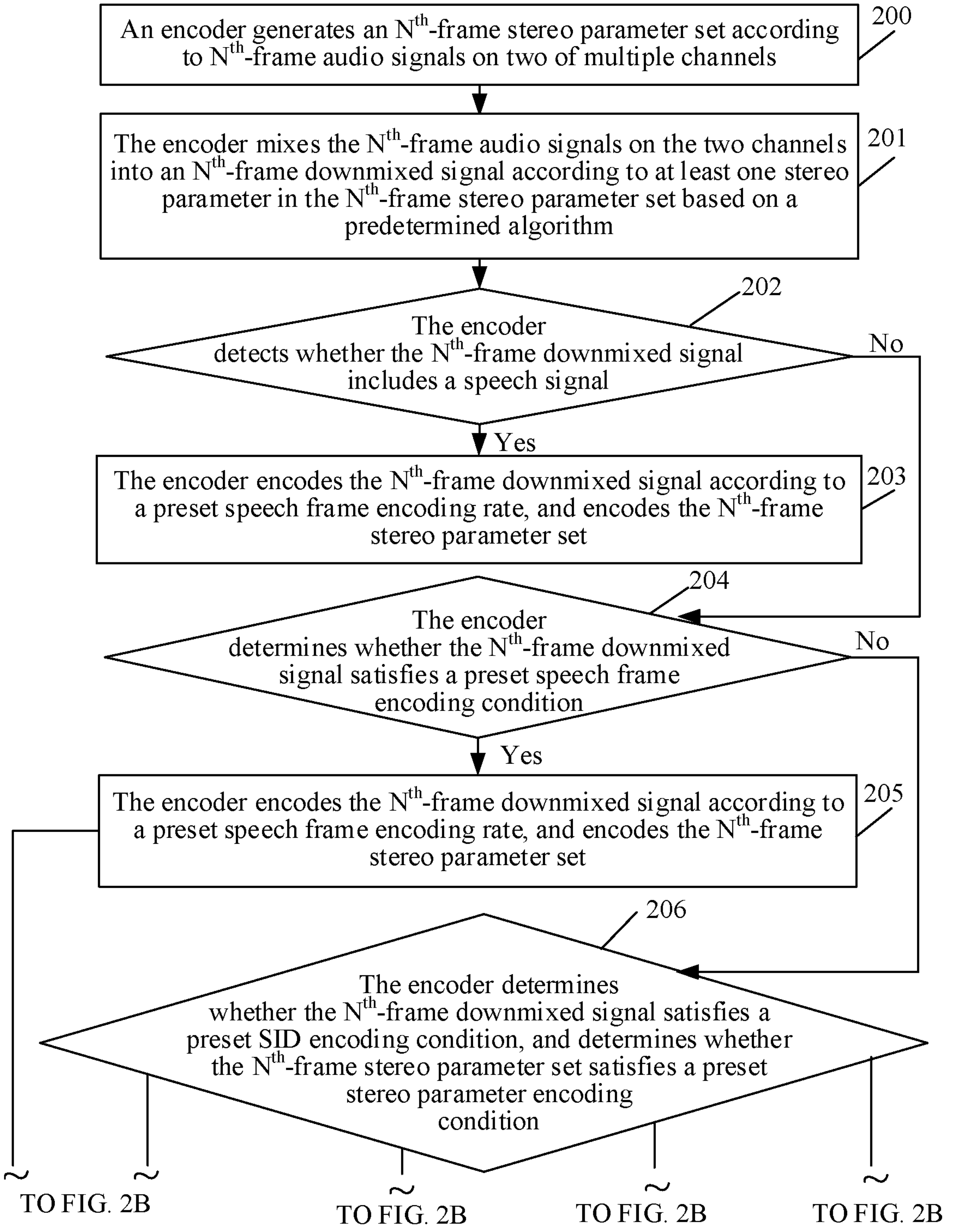
FIG. 2A, FIG. 2B, and FIG. 2C are a schematic flowchart of a multichannel audio signal processing method according to Embodiment 2 of the present disclosure.
Figure 2B:
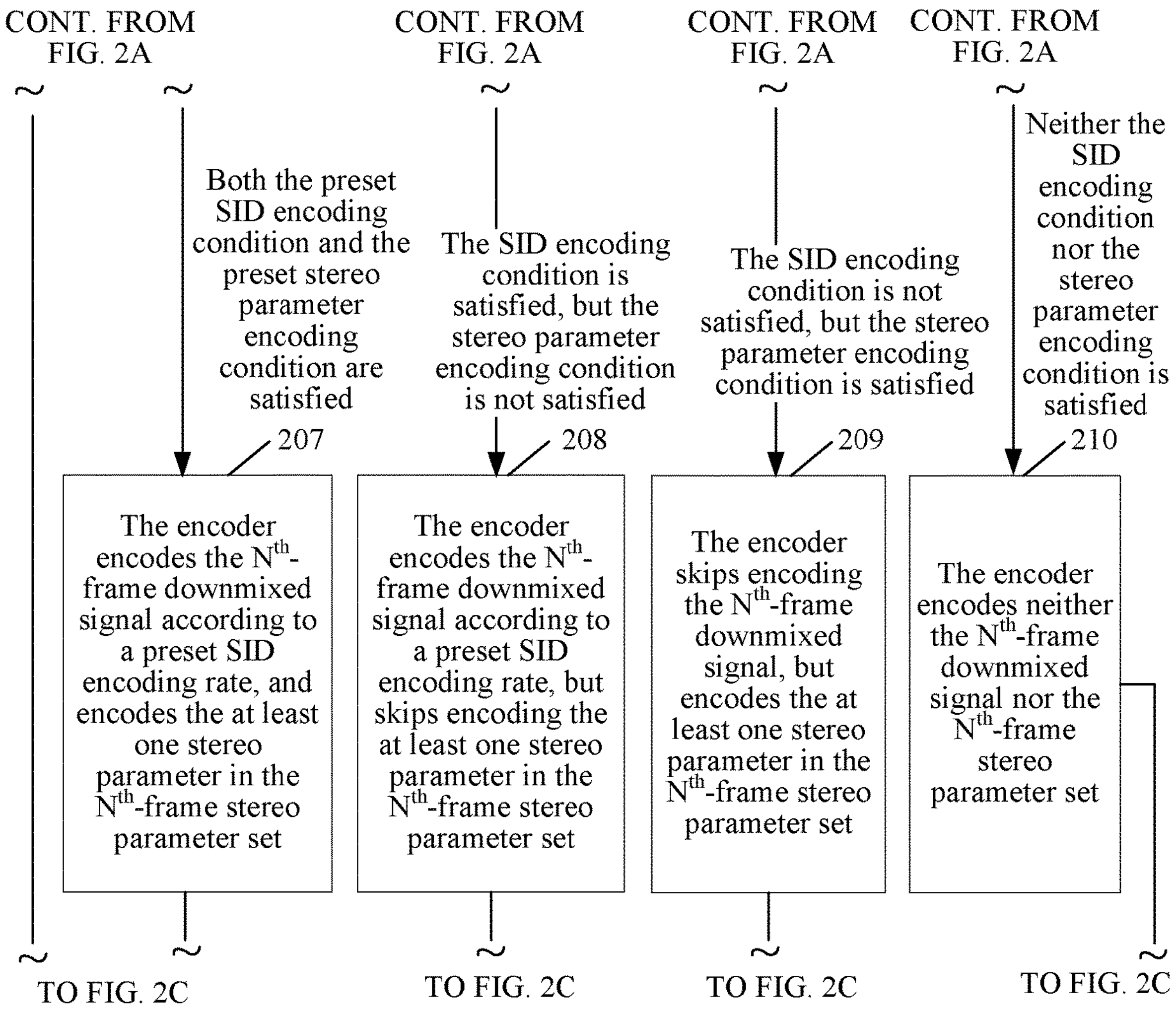
Figure 2C:
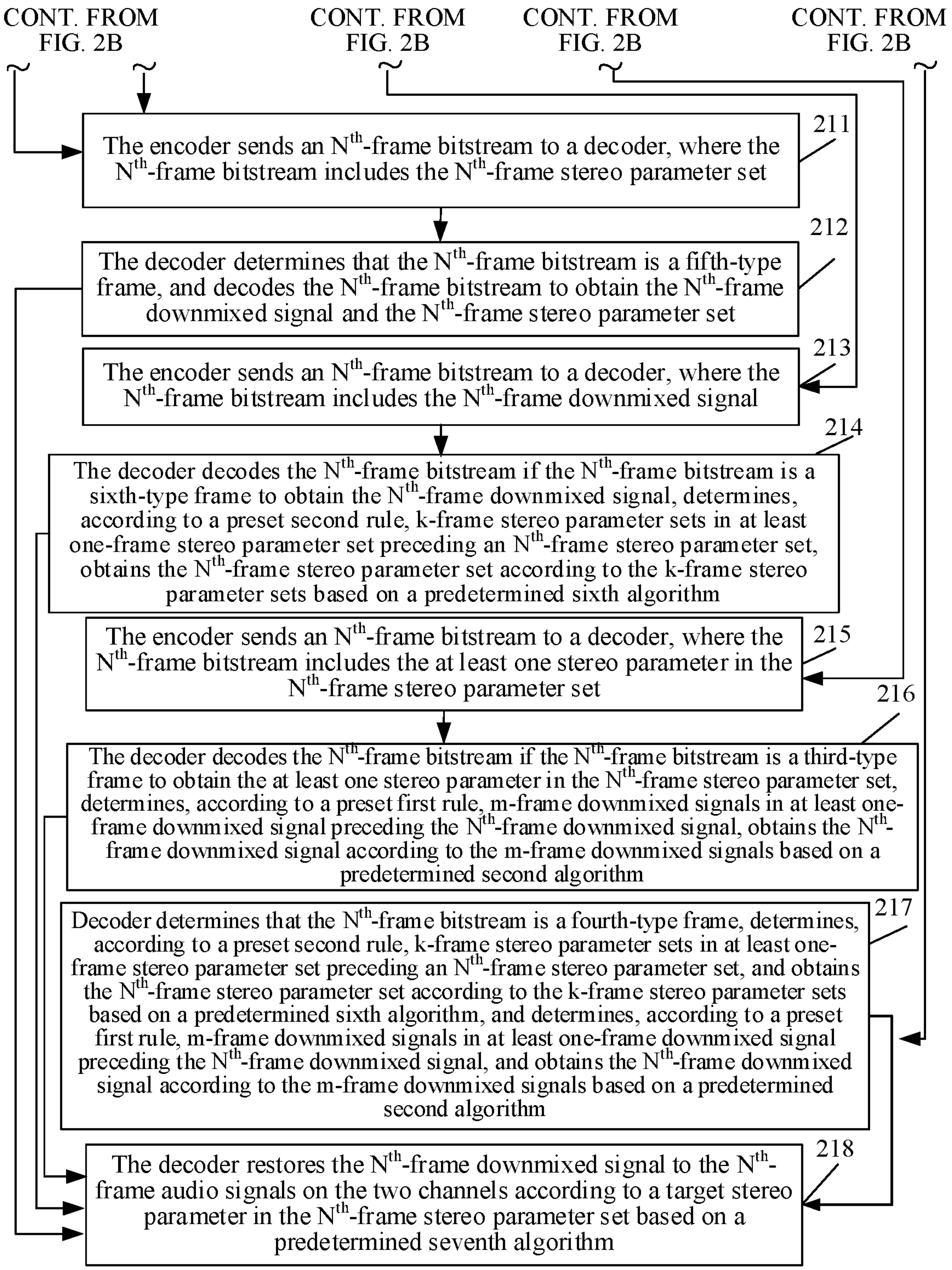

In addition, to improve compression efficiency during encoding in a multichannel communications system, when implementing discontinuous encoding on a downmixed signal, an encoder may further implement discontinuous encoding on a stereo parameter set. An $N^{th}$-frame downmixed signal is used as an example below. As shown in FIG. 2A, FIG. 2B, and FIG. 2C, a multichannel audio signal processing method in Embodiment 2 of the present disclosure includes the following steps.

Step 200: An encoder generates an $N^{th}$-frame stereo parameter set according to $N^{th}$-frame audio signals on two of multiple channels, where the stereo parameter set includes Z stereo parameters.

Further, the Z stereo parameters include a parameter that is used when the encoder mixes the $N^{th}$-frame audio signals based on a predetermined first algorithm, and Z is a positive integer greater than 0. It should be understood that the predetermined first algorithm is a downmixed signal generation algorithm preset in the encoder.

It should be noted that stereo parameters included in the $N^{th}$-frame stereo parameter set are determined using a preset stereo parameter generation algorithm. Assuming that one of the two channels is a left channel, and the other is a right channel, the preset stereo parameter generation algorithm is as follows, and a stereo parameter obtained according to the $N^{th}$-frame audio signals is an ITD:

$$c_n(i) = \sum_{j=0}^{N-1-i} r(j) * l(j+i), \text{ and } c_p(i) = \sum_{j=0}^{N-1-i} l(j) * r(j+1),$$

where $0 \le i \le T_{max}$, N is a frame length, l(j) represents a time-domain signal frame on the left channel at a moment j, r(j) represents a time-domain signal frame on the right channel at the moment j, and if $$\max_{0 \le i \le T_{max}} (c_n(i)) > \max_{0 \le i \le T_{max}} (c_p(i)),$$

the ITD is an opposite number of an index value corresponding to $$\max_{0 \le i \le T_{max}} (c_n(i)),$$

otherwise, the ITD is an opposite number of an index value corresponding to $$\max_{0 \le i \le T_{max}} (c_p(i)).$$

Another algorithm for obtaining the ITD is also applicable to this embodiment of the present disclosure.

If the preset stereo parameter generation algorithm further includes the following IPD generation algorithm, an IPD may be further obtained according to the following algorithm. Further, an IPD in a $b^{th}$ sub frequency band satisfies the following expression:

$$IPD(b) = \arg\left(\sum_{k=A_{b-1}}^{A_{b-1}} L(k)R^*(k)\right), 0 \le b \le B,$$

where B is a total quantity of sub frequency bands occupied by an audio signal in a frequency domain. L(k) is a signal of an $N^{th}$-frame audio signal on the left channel in a $k^{th}$ frequency bin, and R*(k) is a signal conjugate of $N^{th}$-frame audio signals on the right channel in the $k^{th}$ frequency bin.

In addition, when the preset stereo parameter generation algorithm further includes an ILD generation algorithm in Embodiment 1 of the present disclosure, an ILD may be further obtained.

Step 201: The encoder mixes the $N^{th}$-frame audio signals on the two channels into an $N^{th}$-frame downmixed signal according to at least one stereo parameter in the $N^{th}$-frame stereo parameter set based on a predetermined algorithm.

Further, for the predetermined first algorithm, refer to the method for obtaining an $N^{th}$-frame downmixed signal in Embodiment 1 of the present disclosure. However, the predetermined first algorithm is not limited to the method for obtaining an $N^{th}$-frame downmixed signal in Embodiment 1 of the present disclosure.

Step 202: The encoder detects whether the $N^{th}$-frame downmixed signal includes a speech signal, and if the $N^{th}$-frame downmixed signal includes the speech signal, performs step 203, or if the $N^{th}$-frame downmixed signal does not include the speech signal, performs step 204.

In Embodiment 2 of the present disclosure, for a specific implementation of detecting, by the encoder, whether the $N^{th}$-frame downmixed signal includes the speech signal, refer to the manner of detecting, by the encoder, whether the $N^{th}$-frame downmixed signal includes the speech signal in Embodiment 1 of the present disclosure.

Step 203: The encoder encodes the $N^{th}$-frame downmixed signal according to a preset speech frame encoding rate, encodes the $N^{th}$-frame stereo parameter set, and performs step 211.

Further, when the encoder includes two manners of encoding a stereo parameter set, a first encoding manner and a second encoding manner, an encoding rate stipulated in the first encoding manner is not less than an encoding rate stipulated in the second encoding manner, and/or, for any stereo parameter in the $N^{th}$-frame stereo parameter set, quantization precision stipulated in the first encoding manner is not lower than quantization precision stipulated in the second encoding manner. In step 203, the encoder encodes the $N^{th}$-frame stereo parameter set according to the first encoding manner.

For example, the $N^{th}$-frame stereo parameter set includes an IPD and an ITD. IPD quantization precision stipulated in the first encoding manner is not lower than IPD quantization precision stipulated in the second encoding manner, and ITD quantization precision stipulated in the first encoding manner is not lower than ITD quantization precision stipulated in the second encoding manner.

The speech frame encoding rate may be set to 13.2 kbps.

Step 204: The encoder determines whether the $N^{th}$-frame downmixed signal satisfies a preset speech frame encoding condition, and if the $N^{th}$-frame downmixed signal satisfies the preset speech frame encoding condition, performs step 205, or if the $N^{th}$-frame downmixed signal does not satisfy the preset speech frame encoding condition, performs step 206.

Step 205: The encoder encodes the $N^{th}$-frame downmixed signal according to a preset speech frame encoding rate, encodes the $N^{th}$-frame stereo parameter set, and performs step 211.

Further, when the encoder includes two manners of encoding a stereo parameter set a first encoding manner and a second encoding manner, an encoding rate stipulated in the first encoding manner is not less than an encoding rate stipulated in the second encoding manner, and/or, for any stereo parameter in the $N^{th}$-frame stereo parameter set, quantization precision stipulated in the first encoding manner is not lower than quantization precision stipulated in the second encoding manner. In step 205, the encoder encodes the $N^{th}$-frame stereo parameter set according to the first encoding manner.

Step 206: The encoder determines whether the $N^{th}$-frame downmixed signal satisfies a preset SID encoding condition, and determines whether the $N^{th}$-frame stereo parameter set satisfies a preset stereo parameter encoding condition, and if the $N^{th}$-frame downmixed signal satisfies the preset SID encoding condition and the $N^{th}$-frame stereo parameter set satisfies the preset stereo parameter encoding condition, performs step 207, or if the $N^{th}$-frame downmixed signal satisfies the preset SID encoding condition, but the $N^{th}$-frame stereo parameter set does not satisfy the preset stereo parameter encoding condition, performs step 208, or if the $N^{th}$-frame downmixed signal does not satisfy the preset SID encoding condition, but the $N^{th}$-frame stereo parameter set satisfies the preset stereo parameter encoding condition, performs step 209, or if the $N^{th}$-frame downmixed signal does not satisfy the preset SID encoding condition and the $N^{th}$-frame stereo parameter set does not satisfy the preset stereo parameter encoding condition, performs step 210.

Further, before encoding the at least one stereo parameter in the $N^{th}$-frame stereo parameter set, the encoder determines whether a stereo parameter in the at least one stereo parameter satisfies a preset corresponding stereo parameter encoding condition. Further, if the at least one stereo parameter in the $N^{th}$-frame stereo parameter set includes an ILD, the preset stereo parameter encoding condition includes $D_L \ge D_0$, where $D_L$ represents a degree by which the ILD deviates from a first standard, the first standard is determined based on a predetermined third algorithm according to T-frame stereo parameter sets preceding the $N^{th}$-frame stereo parameter set, and T is a positive integer greater than 0.

If the at least one stereo parameter in the $N^{th}$-frame stereo parameter set includes an ITD, the preset stereo parameter encoding condition includes $D_T \ge D_1$, where $D_T$ represents a degree by which the ITD deviates from a second standard, the second standard is determined based on a predetermined fourth algorithm according to T-frame stereo parameter sets preceding the $N^{th}$-frame stereo parameter set, and T is a positive integer greater than 0.

If the at least one stereo parameter in the $N^{th}$-frame stereo parameter set includes an IPD, the preset stereo parameter encoding condition includes $D_P \geq D_2$, where $D_P$ represents a degree by which the IPD deviates from a third standard, the third standard is determined based on a predetermined fifth algorithm according to T-frame stereo parameter sets preceding the $N^{th}$-frame stereo parameter set, and T is a positive integer greater than 0.

The third algorithm, the fourth algorithm, and the fifth algorithm need to be preset according to an actual situation.

Further, when the at least one stereo parameter in the $N^{th}$-frame stereo parameter set includes only the ITD, the preset stereo parameter encoding condition includes only $D_T \geq D_1$, and when the ITD included in the at least one stereo parameter in the $N^{th}$-frame stereo parameter set satisfies $D_T \geq D_1$, the at least one stereo parameter in the $N^{th}$-frame stereo parameter set is encoded. When the at least one stereo parameter in the $N^{th}$-frame stereo parameter set includes only the ITD and the IPD, the preset stereo parameter encoding condition includes only $D_T \geq D_1$, and when the ITD included in the at least one stereo parameter in the $N^{th}$-frame stereo parameter set satisfies $D_T \geq D_1$, the at least one stereo parameter in the $N^{th}$-frame stereo parameter set is encoded. However, when the at least one stereo parameter in the $N^{th}$-frame stereo parameter set includes only the ITD and the ILD, the preset stereo parameter encoding condition includes $D_T \geq D_1$ and $D_L \geq D_0$, and the encoder encodes the ITD and the ILD only when the ITD included in the at least one stereo parameter in the $N^{th}$-frame stereo parameter set satisfies $D_T \geq D_1$ and the ILD satisfies $D_L \geq D_0$.

Optionally, $D_L$, $D_T$, and $D_P$ respectively satisfy the following expressions:

$$D_L = \sum_{m=0}^{M-1}\left(ILD(m) - \frac{1}{T}\sum_{t=1}^{T} ILD^{[-t]}(m)\right);$$

$$D_T = ITD - \frac{1}{T}\sum_{t=1}^{T} ITD^{[-t]}(m); \text{ and}$$

$$D_P \sum_{m=0}^{M-1}\left(IPD(m) - \frac{1}{T}\sum_{t=1}^{T} IPD^{[-t]}(m)\right),$$

where ILD(m) is a level difference generated when the $N^{th}$-frame audio signals are respectively transmitted on the two channels in an $m^{th}$ sub frequency band, M is a total quantity of sub frequency bands occupied for transmitting the $N^{th}$-frame audio signals $$\frac{1}{T}\sum_{t=1}^{T} ILD^{[-t]}(m)$$

is an average value of ILDs in the T-frame stereo parameter sets preceding the $N^{th}$-frame stereo parameter set in the $m^{th}$ sub frequency band, T is a positive integer greater than 0, $ILD^{[-t]}(m)$ is a level difference generated when $t^{th}$-frame audio signals preceding the $N^{th}$-frame audio signals are respectively transmitted on the two channels in the $m^{th}$ sub frequency band, the ITD is a time difference generated when the $N^{th}$-frame audio signals are respectively transmitted on the two channels $$\frac{1}{T}\sum_{t=1}^{T} ITD^{[-t]}$$

is an average value of ITDs in the T-frame stereo parameter sets preceding the $N^{th}$-frame stereo parameter set, $ITD^{[-t]}$ is a time difference generated when the $t^{th}$-frame audio signals preceding the $N^{th}$-frame audio signals are respectively transmitted on the two channels, IPD(m) is a phase difference generated when some of the $N^{th}$-frame audio signals are respectively transmitted on the two channels in the $m^{th}$ sub frequency band $$\frac{1}{T}\sum_{t=1}^{T} IPD^{[-t]}(m)$$

is an average value of IPDs in the T-frame stereo parameter sets preceding the $N^{th}$-frame stereo parameter set in the $m^{th}$ sub frequency band, and $IPD^{[-t]}(m)$ is a phase difference generated when the $t^{th}$-frame audio signals preceding the $N^{th}$-frame audio signals are respectively transmitted on the two channels in the $m^{th}$ sub frequency band.

Step 207: The encoder encodes the $N^{th}$-frame downmixed signal according to a preset SID encoding rate, encodes the at least one stereo parameter in the $N^{th}$-frame stereo parameter set, and performs step 211.

Further, when the encoder includes two manners of encoding a stereo parameter set, a first encoding manner and a second encoding manner, an encoding rate stipulated in the first encoding manner is not less than an encoding rate stipulated in the second encoding manner, and/or, for any stereo parameter in the $N^{th}$-frame stereo parameter set, quantization precision stipulated in the first encoding manner is not lower than quantization precision stipulated in the second encoding manner. The encoder encodes the at least one stereo parameter in the $N^{th}$-frame stereo parameter set according to the second encoding manner.

For example, in the first encoding manner, the encoder encodes the $N^{th}$-frame stereo parameter set according to 4.2 kbps, and in the second encoding manner, the encoder encodes the $N^{th}$-frame stereo parameter set according to 1.2 kbps.

To improve efficiency of compressing the stereo parameter set by the encoder, optionally, the encoder obtains X target stereo parameters according to the Z stereo parameters in the $N^{th}$-frame stereo parameter set based on a preset stereo parameter dimension reduction rule, and encodes the X target stereo parameters. X is a positive integer greater than 0 and less than or equal to Z.

Further, the $N^{th}$-frame stereo parameter set includes three types of stereo parameters: an IPD, an ITD, and an ILD. The ILD includes ILDs in 10 sub frequency bands: an ILD (0), . . . , and an ILD(9), the IPD includes IPDs in 10 sub frequency bands: an IPD(0), . . . , and an IPD(9), and the ITD includes ITDs in two time-domain subbands: an ITD(0) and an ITD(1). Assuming that the preset stereo parameter dimension reduction rule is that the stereo parameter set includes only two types of stereo parameters, the encoder selects any two types of stereo parameters from the IPD, the ITD, and the ILD. Assuming that the IPD and the ILD are selected, the encoder encodes the IPD and the ILD. Alternatively, if the preset stereo parameter dimension reduction rule is that only a half of each type of stereo parameters is reserved, five ILDs are selected from the ILD(0), . . . , and the ILD(9), five IPDs are selected from the IPD(0), . . . , and the IPD(9), one ITD is selected from the ITD(0) and the ITD(1), and the selected parameters are encoded. Alternatively, the preset stereo parameter dimension reduction rule is that five ILDs and five IPDs are selected. Alternatively, if the preset stereo parameter dimension reduction rule is that frequency-domain resolution of the ILDs, frequency-domain resolution of the IPDs, and time-domain resolution of the ITDs are reduced, ILDs in neighboring sub frequency bands in the ILD(0), . . . , and the ILD(9) are combined. For example, an average value of the ILD(0) and the ILD(1) is calculated to obtain a new ILD(0), an average value of the ILD(2) and the ILD(3) is calculated to obtain a new ILD(1), . . . , and an average value of the ILD(8) and the ILD(9) is calculated to obtain a new ILD(4). A sub frequency band corresponding to the new ILD(0) is obtained by combining sub frequency bands corresponding to the original ILD(0) and the original ILD(1), . . . , and a sub frequency band corresponding to the new ILD(4) is obtained by combining corresponding to the original ILD(8) and the original ILD(9). According to the same method, IPDs in neighboring sub frequency bands in the IPD(0), . . . , and the IPD(9) are combined, to obtain a new IPD(0), . . . , and a new IPD(4), and an average value of the ITD(0) and the ITD(1) is also calculated to obtain a new ITD(0). A time-domain signal corresponding to the new ITD(0) is obtained by combining corresponding to the original ITD(0) and the original ITD(1). The new ILD(0), . . . , and the new ILD(4), the new IPD(0) . . . , and the new IPD(4), and the new ITD(0) are encoded. Alternatively, if the preset stereo parameter dimension reduction rule is that frequency-domain resolution of the ILDs is reduced, ILDs in neighboring sub frequency bands in the ILD(0) . . . , and the ILD(9) are combined. For example, an average value of the ILD(0) and the ILD(1) is calculated to obtain a new ILD(0), an average value of the ILD(2) and the ILD(3) is calculated to obtain a new ILD(1), . . . , and an average value of the ILD(8) and the ILD(9) is calculated to obtain a new ILD(4). A sub frequency band corresponding to the new ILD(0) is obtained by combining corresponding to the original ILD(0) and the original ILD(1), . . . , and a sub frequency band corresponding to the new ILD(4) is obtained by combining corresponding to the original ILD(8) and the original ILD(9). Then, the new ILD(0), . . . , and the new ILD(4) are encoded.

Step 208: The encoder encodes the $N^{th}$-frame downmixed signal according to a preset SID encoding rate, but skips encoding the at least one stereo parameter in the $N^{th}$-frame stereo parameter set, and performs step 211.

Step 209: The encoder encodes the at least one stereo parameter in the $N^{th}$-frame stereo parameter set, but skips encoding the $N^{th}$-frame downmixed signal, and performs step 215.

Step 210: The encoder encodes neither the $N^{th}$-frame downmixed signal nor the $N^{th}$-frame stereo parameter set, and performs step 217.

In Embodiment 2 of the present disclosure, the encoder performs encoding to obtain a bitstream. The bitstream includes four different types of frames, that is, a third-type frame, a fourth-type frame, a fifth-type frame, and a sixth-type frame. The third-type frame includes a stereo parameter set, but does not include a downmixed signal, the fourth-type frame includes neither a downmixed signal nor a stereo parameter set, the fifth-type frame includes both a downmixed signal and a stereo parameter set, and the sixth-type frame includes a downmixed signal, but does not include a stereo parameter set. Each of the fifth-type frame and the sixth-type frame is one case of a type frame including a downmixed signal, and each of the third-type frame and the fourth-type frame is one case of a type frame including no downmixed signal.

Further, an $N^{th}$-frame bitstream obtained in step 203, step 205, or step 207 is the fifth-type frame, an $N^{th}$-frame bitstream obtained in step 208 is the sixth-type frame, an $N^{th}$-frame bitstream obtained in step 209 is the third-type frame, and an $N^{th}$-frame bitstream obtained in step 211 is the fourth-type frame.

Step 211: The encoder sends an $N^{th}$-frame bitstream to a decoder, where the $N^{th}$-frame bitstream includes the $N^{th}$-frame downmixed signal and the $N^{th}$-frame stereo parameter set.

Step 212: The decoder receives the $N^{th}$-frame bitstream, decodes the $N^{th}$-frame bitstream if determining that the $N^{th}$-frame bitstream is a fifth-type frame to obtain the $N^{th}$-frame downmixed signal and the $N^{th}$-frame stereo parameter set, and performs step 218.

For a specific implementation of determining, by the decoder, which type frame the $N^{th}$-frame bitstream is, refer to Embodiment 1 of the present disclosure.

Further, the decoder decodes the $N^{th}$-frame bitstream according to a rate corresponding to the $N^{th}$-frame bitstream. Further, if the encoder encodes the $N^{th}$-frame downmixed signal according to 13.2 kbps, the decoder decodes a bitstream of the $N^{th}$-frame downmixed signal in the $N^{th}$-frame bitstream according to 13.2 kbps. If the encoder encodes the $N^{th}$-frame stereo parameter set according to 4.2 kbps, the decoder decodes a bitstream of the $N^{th}$-frame stereo parameter set in the $N^{th}$-frame bitstream according to 4.2 kbps.

Step 213: The encoder sends an $N^{th}$-frame bitstream to a decoder, where the $N^{th}$-frame bitstream includes the $N^{th}$-frame downmixed signal.

Step 214: The decoder decodes the $N^{th}$-frame bitstream if the $N^{th}$-frame bitstream is a sixth-type frame to obtain the $N^{th}$-frame downmixed signal, determines, according to a preset second rule, k-frame stereo parameter sets in at least one-frame stereo parameter set preceding an $N^{th}$-frame stereo parameter set, obtains the $N^{th}$-frame stereo parameter set according to the k-frame stereo parameter sets based on a predetermined sixth algorithm, and performs step 218.

Further, using a stereo parameter in the $N^{th}$-frame stereo parameter set as an example, a stereo parameter set stipulated in the preset second rule is a frame of stereo parameter set that is closest to P and that is obtained by means of decoding, and an $N^{th}$-frame stereo parameter P is obtained according to the following algorithm:

$$P=\tilde{P}^{[-t]}+\delta,$$

where P represents the $N^{th}$-frame stereo parameter, $\tilde{P}^{[-t]}$ represents a frame of stereo parameter that is closest to P and that is obtained by means of decoding, and δ represents a random number whose absolute value is relatively small. For example, δ may be a random number between $-\tilde{P}^{[-t]}\times 5\%$ and $+\tilde{P}^{[-t]}\times 5\%$.

It should be noted that this embodiment of the present disclosure imposes no limitation on the method for estimating stereo parameters in the $N^{th}$-frame stereo parameter set.

Step 215: The encoder sends an $N^{th}$-frame bitstream to a decoder, where the $N^{th}$-frame bitstream includes the at least one stereo parameter in the $N^{th}$-frame stereo parameter set.

Step 216: The decoder decodes the $N^{th}$-frame bitstream if the $N^{th}$-frame bitstream is a third-type frame to obtain the at least one stereo parameter in the $N^{th}$-frame stereo parameter set, determines, according to a preset first rule, m-frame downmixed signals in at least one-frame downmixed signal preceding the $N^{th}$-frame downmixed signal, obtains the $N^{th}$-frame downmixed signal according to the m-frame downmixed signals based on a predetermined second algorithm, where m is a positive integer greater than 0, and performs step 218.

Further, an average value of an $(N-3)^{th}$-frame downmixed signal, an $(N-2)^{th}$-frame downmixed signal, and an $(N-1)^{th}$-frame downmixed signal is used as the $N^{th}$-frame downmixed signal, or an $(N-1)^{th}$-frame downmixed signal is directly used as the $N^{th}$-frame downmixed signal, or the $N^{th}$-frame downmixed signal is estimated according to another algorithm.

In addition, the $(N-1)^{th}$-frame downmixed signal may be directly used as the $N^{th}$-frame downmixed signal, or the $N^{th}$-frame downmixed signal is calculated according to the $(N-1)^{th}$-frame downmixed signal and a preset offset value based on a preset algorithm.

Step 217: After receiving an $N^{th}$-frame bitstream, a decoder determines that the $N^{th}$-frame bitstream is a fourth-type frame, determines, according to a preset second rule, k-frame stereo parameter sets in at least one-frame stereo parameter set preceding an $N^{th}$-frame stereo parameter set, and obtains the $N^{th}$-frame stereo parameter set according to the k-frame stereo parameter sets based on a predetermined sixth algorithm, and determines, according to a preset first rule, i-frame downmixed signals in at least one-frame downmixed signal preceding the $N^{th}$-frame downmixed signal, and obtains the $N^{th}$-frame downmixed signal according to the m-frame downmixed signals based on a predetermined second algorithm, where m is a positive integer greater than 0.

Step 218: The decoder restores the $N^{th}$-frame downmixed signal to the $N^{th}$-frame audio signals on the two channels according to a target stereo parameter in the $N^{th}$-frame stereo parameter set based on a predetermined seventh algorithm.

In addition, based on this embodiment of the present disclosure, if the encoder detects, using the $N^{th}$-fame audio signals on the two channels, whether the $N^{th}$-frame downmixed signal includes the speech signal, another manner of encoding a stereo parameter set is further provided. Further, if detecting that either of the $N^{th}$-frame audio signals on the two channels includes the speech signal, the encoder obtains the $N^{th}$-frame stereo parameter set according to the $N^{th}$-frame audio signals based on a first stereo parameter set generation manner, and encodes the $N^{th}$-frame stereo parameter set.

When the encoder determines that neither of the $N^{th}$-frame audio signals on the two channels includes the speech signal if the $N^{th}$-frame audio signals satisfy a preset speech frame encoding condition, the encoder obtains the $N^{th}$-frame stereo parameter set according to the $N^{th}$-frame audio signals based on a first stereo parameter set generation manner, and encodes the $N^{th}$-frame stereo parameter set, or if the $N^{th}$-frame audio signals do not satisfy a preset speech frame encoding condition, the encoder obtains the $N^{th}$-frame stereo parameter set according to the $N^{th}$-frame audio signals based on a second stereo parameter set generation manner, and encodes at least one stereo parameter in the $N^{th}$-frame stereo parameter set when determining that the $N^{th}$-frame stereo parameter set satisfies a preset stereo parameter encoding condition, or skips encoding the stereo parameter set when determining that the $N^{th}$-frame stereo parameter set does not satisfy a preset stereo parameter encoding condition.

The first stereo parameter set generation manner and the second stereo parameter set generation manner satisfy at least one of the following conditions.

A quantity that is of types of stereo parameters included in a stereo parameter set and that is stipulated in the first stereo parameter set generation manner is not less than a quantity that is of types of stereo parameters included in a stereo parameter set and that is stipulated in the second stereo parameter set generation manner, a quantity that is of stereo parameters included in a stereo parameter set and that is stipulated in the first stereo parameter set generation manner is not less than a quantity that is of stereo parameters included in a stereo parameter set and that is stipulated in the second stereo parameter set generation manner, time-domain resolution that is of a stereo parameter and that is stipulated in the first stereo parameter set generation manner is not lower than time-domain resolution that is of a corresponding stereo parameter and that is stipulated in the second stereo parameter set generation manner, or frequency-domain resolution that is of a stereo parameter and that is stipulated in the first stereo parameter set generation manner is not lower than frequency-domain resolution that is of a corresponding stereo parameter and that is stipulated in the second stereo parameter set generation manner.

Further, frequency-domain precision or time-domain precision of a stereo parameter set obtained in the first stereo parameter set generation manner is higher than that of a stereo parameter set obtained in the second stereo parameter set generation manner.

In addition, in a multichannel audio signal processing method in Embodiment 3 of the present disclosure, when detecting that an $N^{th}$-frame downmixed signal includes a speech signal, an encoder encodes the $N^{th}$-frame downmixed signal according to a speech encoding rate, and encodes an $N^{th}$-frame stereo parameter set, or when an encoder detects that an $N^{th}$-frame downmixed signal does not include a speech signal, if the $N^{th}$-frame downmixed signal satisfies a preset speech frame encoding condition, the encoder encodes the $N^{th}$-frame downmixed signal according to a speech encoding rate, and encodes an $N^{th}$-frame stereo parameter set, or if the N-frame downmixed signal does not satisfy a preset speech frame encoding condition, but satisfies a preset SID encoding condition, the encoder encodes the $N^{th}$-frame downmixed signal according to an SID encoding rate, and encodes at least one stereo parameter in an $N^{th}$-frame stereo parameter set, or if the $N^{th}$-frame downmixed signal satisfies neither a preset speech frame encoding condition nor a preset SID encoding condition, the encoder encodes neither the $N^{th}$-frame downmixed signal nor an $N^{th}$-frame stereo parameter set.

It should be understood that a difference between Embodiment 3 of the present disclosure and Embodiment 1 of the present disclosure or between Embodiment 3 of the present disclosure and Embodiment 2 of the present disclosure lies in that the encoder does not perform determining on a stereo parameter set, and encodes the stereo parameter set regardless of which manner is used to encode a downmixed signal.

In Embodiment 3 of the present disclosure, a bitstream obtained after the encoder encodes the downmixed signal includes two types of frames, a first-type frame and a second-type frame. The first-type frame includes both a downmixed signal and a stereo parameter set, and the second-type frame includes neither a downmixed signal nor a stereo parameter set. Further, for a method for restoring the bitstream to audio signals on two channels by a decoder after receiving the bitstream, refer to Embodiment 2 of the present disclosure and Embodiment 1 of the present disclosure.

Based on Embodiment 3 of the present disclosure, optionally, when the $N^{th}$-frame downmixed signal satisfies neither the preset speech frame encoding condition nor the preset SID encoding condition, the encoder determines whether the $N^{th}$-frame stereo parameter set satisfies a preset stereo parameter encoding condition, and if the $N^{th}$-frame stereo parameter set satisfies the preset stereo parameter encoding condition, the encoder does not encode the $N^{th}$-frame downmixed signal, but encodes at least one stereo parameter in the $N^{th}$-frame stereo parameter set, or if the $N^{th}$-frame stereo parameter set does not satisfy the preset stereo parameter encoding condition, the encoder encodes neither the $N^{th}$-frame downmixed signal nor the $N^{th}$-frame stereo parameter set.

A bitstream obtained based on the foregoing encoding method includes three types of frames, a first-type frame, a third-type frame, and a fourth-type frame. The first-type frame includes both a downmixed signal and a stereo parameter set, the third-type frame does not include a downmixed signal, but includes a stereo parameter set, and the fourth-type frame includes neither a downmixed signal nor a stereo parameter set. Further, for a method for restoring the bitstream to audio signals on two channels by a decoder after receiving the bitstream, refer to Embodiment 2 of the present disclosure and Embodiment 1 of the present disclosure.

A difference between the foregoing technical solution and Embodiment 2 of the present disclosure lies in when the $N^{th}$-frame downmixed signal satisfies neither the preset speech frame encoding condition nor the preset SID encoding condition, the encoder determines whether the $N^{th}$-frame stereo parameter set satisfies the preset stereo parameter encoding condition.

Optionally, in a multichannel audio signal processing method in Embodiment 4 of the present disclosure, when detecting that an $N^{th}$-frame downmixed signal includes a speech signal, an encoder encodes the $N^{th}$-frame downmixed signal according to a speech encoding rate, and encodes an $N^{th}$-frame stereo parameter set, or when an encoder detects that an $N^{th}$-frame downmixed signal does not include a speech signal, if the $N^{th}$-frame downmixed signal satisfies a preset speech frame encoding condition, the encoder encodes the $N^{th}$-frame downmixed signal according to a speech encoding rate, and encodes an $N^{th}$-frame stereo parameter set, or if the $N^{th}$-frame downmixed signal does not satisfy a preset speech frame encoding condition, but satisfies a preset SID encoding condition, the encoder determines whether an $N^{th}$-frame stereo parameter set satisfies a preset stereo parameter encoding condition, and when the $N^{th}$-frame stereo parameter set satisfies the preset stereo parameter encoding condition, the encoder encodes the $N^{th}$-frame downmixed signal according to an SID encoding rate, and encodes at least one stereo parameter in the $N^{th}$-frame stereo parameter set, or when the $N^{th}$-frame stereo parameter set does not satisfy a preset stereo parameter encoding condition, the encoder encodes the $N^{th}$-frame downmixed signal according to an SID encoding rate, but does not encode the $N^{th}$-frame stereo parameter set, or if the $N^{th}$-frame downmixed signal satisfies neither a preset speech frame encoding condition nor a preset SID encoding condition, the encoder encodes neither the $N^{th}$-frame downmixed signal nor an $N^{th}$-frame stereo parameter set.

A bitstream obtained based on an encoding manner in Embodiment 4 of the present disclosure includes three types of frames, a fifth-type frame, a sixth-type frame, and a second-type frame. The fifth-type frame includes both a downmixed signal and a stereo parameter set, the sixth-type frame includes a downmixed signal, but does not include a stereo parameter set, and the second-type frame includes neither a downmixed signal nor a stereo parameter set. Further, for a method for restoring the bitstream to audio signals on two channels by a decoder after receiving the bitstream, refer to Embodiment 2 of the present disclosure and Embodiment 1 of the present disclosure.

A difference between Embodiment 4 of the present disclosure and Embodiment 2 of the present disclosure lies in when the $N^{th}$-frame downmixed signal does not satisfy the preset speech frame encoding condition, but satisfies the preset SID encoding condition, the encoder determines whether to encode the at least one stereo parameter in the $N^{th}$-frame stereo parameter set, and when the $N^{th}$-frame downmixed signal satisfies neither the preset speech frame encoding condition nor the preset SID encoding condition, skips encoding the $N^{th}$-frame stereo parameter set.

In Embodiment 3 of the present disclosure and Embodiment 4 of the present disclosure, further, for a manner of obtaining the $N^{th}$-frame downmixed signal and the $N^{th}$-frame stereo parameter set by the decoder, refer to Embodiment 2 of the present disclosure and Embodiment 1 of the present disclosure, and for a specific implementation of encoding a stereo parameter and a downmixed signal, refer to Embodiment 2 of the present disclosure and Embodiment 1 of the present disclosure.

In any embodiment of the present disclosure, first and second in the predetermined first algorithm and the predetermined second algorithm have no special meanings, and are merely used to distinguish between different algorithms, third, fourth, fifth, sixth, seventh, and the like are similar thereto, and details are not described herein.

Based on a same inventive concept, the embodiments of the present disclosure further provide an encoder, a decoder, and an encoding and decoding system. Because methods corresponding to the encoder, the decoder, and the encoding and decoding system in the embodiments of the present disclosure are the multichannel audio signal processing method in the embodiments of the present disclosure, for implementations of the encoder, the decoder, and the encoding and decoding system in the embodiments of the present disclosure, refer to the implementation of the method, and details are not repeated herein.

Figure 3A:
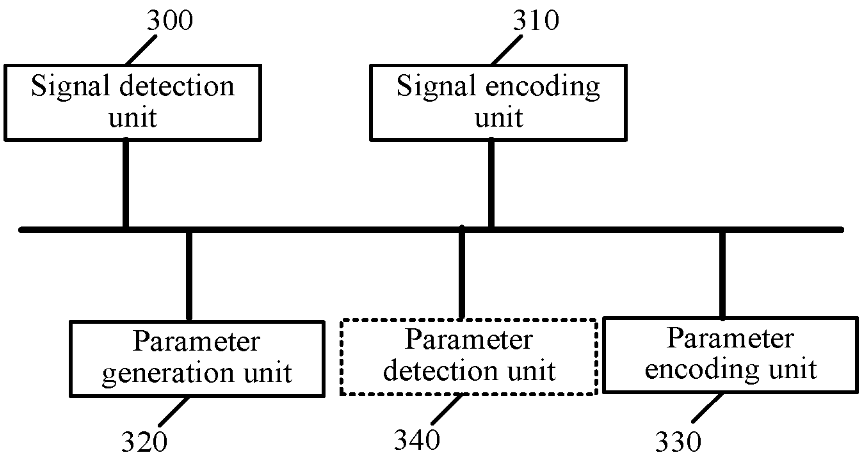
FIG. 3A, FIG. 3B, FIG. 3C, and FIG. 3D are schematic diagrams of an encoder according to an embodiment of the present disclosure.

As shown in FIG. 3A, an encoder in an embodiment of the present disclosure includes a signal detection unit 300 and a signal encoding unit 310. The signal detection unit 300 is configured to detect whether an $N^{th}$-frame downmixed signal includes a speech signal. The $N^{th}$-frame downmixed signal is obtained after $N^{th}$-frame audio signals on two of multiple channels are mixed based on a predetermined first algorithm, and N is a positive integer greater than 0. The signal encoding unit 310 is configured to encode the $N^{th}$-frame downmixed signal when the signal detection unit 300 detects that the $N^{th}$-frame downmixed signal includes the speech signal, or when the signal detection unit 300 detects that the $N^{th}$-frame downmixed signal does not include the speech signal, encode the $N^{th}$-frame downmixed signal if the signal detection unit 300 determines that the $N^{th}$-frame downmixed signal satisfies a preset audio frame encoding condition, or skip encoding the $N^{th}$-frame downmixed signal if the signal detection unit 300 determines that the $N^{th}$-frame downmixed signal does not satisfy a preset audio frame encoding condition.

Optionally, as shown in FIG. 313, the signal encoding unit 310 includes a first signal encoding unit 311 and a second signal encoding unit 312. When the signal detection unit 300 detects that the $N^{th}$-frame downmixed signal includes the speech signal, the signal detection unit 300 instructs the first signal encoding unit 311 to encode the $N^{th}$-frame downmixed signal.

If the $N^{th}$-frame downmixed signal satisfies a preset speech frame encoding condition, the signal detection unit 300 instructs the first signal encoding unit 311 to encode the $N^{th}$-frame downmixed signal.

Further, it is stipulated that the first signal encoding unit 311 encodes the $N^{th}$-frame downmixed signal according to a preset speech frame encoding rate.

If the $N^{th}$-frame downmixed signal does not satisfy a preset speech frame encoding condition, but satisfies a preset SID frame encoding condition, the signal detection unit 300 instructs the second signal encoding unit 312 to encode the $N^{th}$-frame downmixed signal. Further, it is stipulated that the second signal encoding unit 312 encodes the $N^{th}$-frame downmixed signal according to a preset SID encoding rate. The SID encoding rate is not greater than the speech frame encoding rate.

Figure 3B:
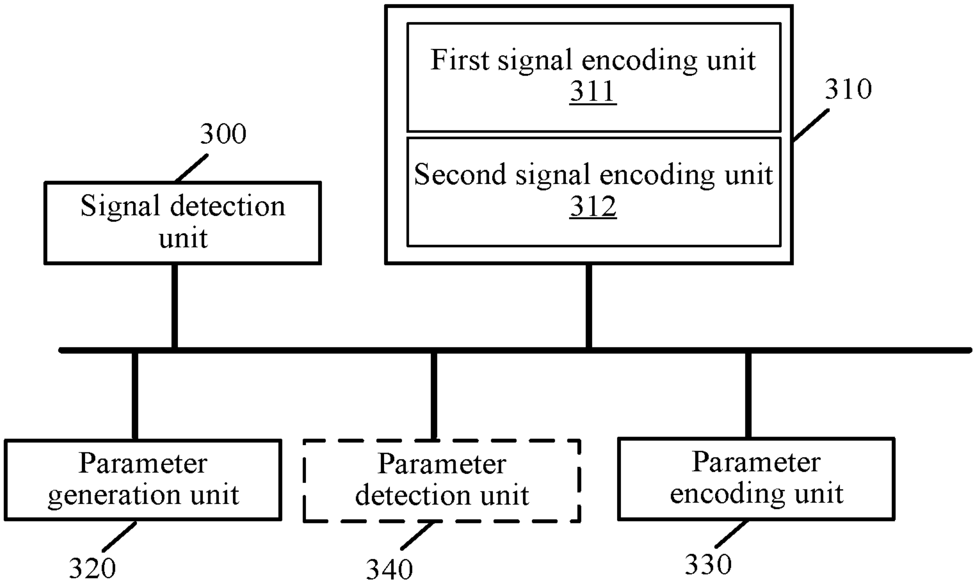

Optionally, as shown in FIG. 3A and FIG. 3B, the encoder further includes a parameter generation unit 320, a parameter encoding unit 330, and a parameter detection unit 340. The parameter generation unit 320 is configured to obtain an $N^{th}$-frame stereo parameter set according to the $N^{th}$-frame audio signals. The $N^{th}$-frame stereo parameter set includes Z stereo parameters, the Z stereo parameters include a parameter that is used when the encoder mixes the $N^{th}$-frame audio signals based on the predetermined first algorithm, and Z is a positive integer greater than 0. The parameter encoding unit 330 is configured to encode the $N^{th}$-frame stereo parameter set when the signal detection unit 300 detects that the $N^{th}$-frame downmixed signal includes the speech signal, or when the signal detection unit 300 detects that the $N^{th}$-frame downmixed signal does not include the speech signal, encode at least one stereo parameter in the $N^{th}$-frame stereo parameter set if the parameter detection unit 340 determines that the $N^{th}$-frame stereo parameter set satisfies a preset stereo parameter encoding condition, or skip encoding the stereo parameter set if the parameter detection unit 340 determines that the $N^{th}$-frame stereo parameter set does not satisfy a preset stereo parameter encoding condition.

Optionally, the parameter encoding unit 330 is configured to obtain X target stereo parameters according to the Z stereo parameters in the $N^{th}$-frame stereo parameter set based on a preset stereo parameter dimension reduction rule, and encode the X target stereo parameters. X is a positive integer greater than 0 and less than or equal to Z.

Further, when the parameter encoding unit 330 includes a first parameter encoding unit 331 and a second parameter encoding unit 332, the second parameter encoding unit 332 is configured to obtain the X target stereo parameters according to the Z stereo parameters in the $N^{th}$-frame stereo parameter set based on the preset stereo parameter dimension reduction rule, and encode the X target stereo parameters.

Figure 3C:
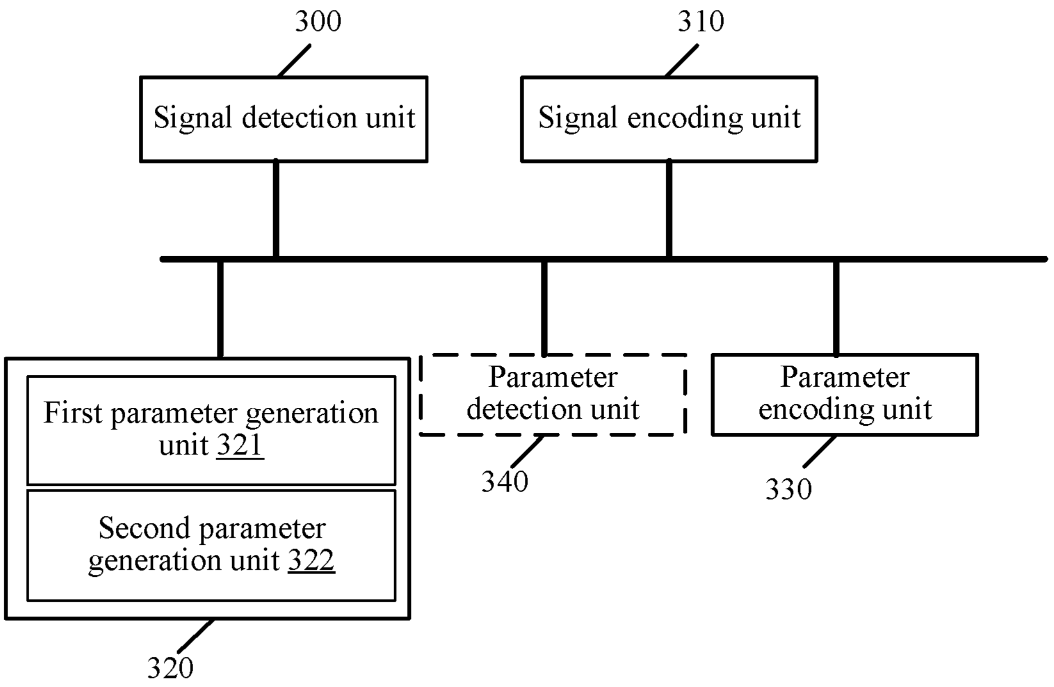
Figure 3D:
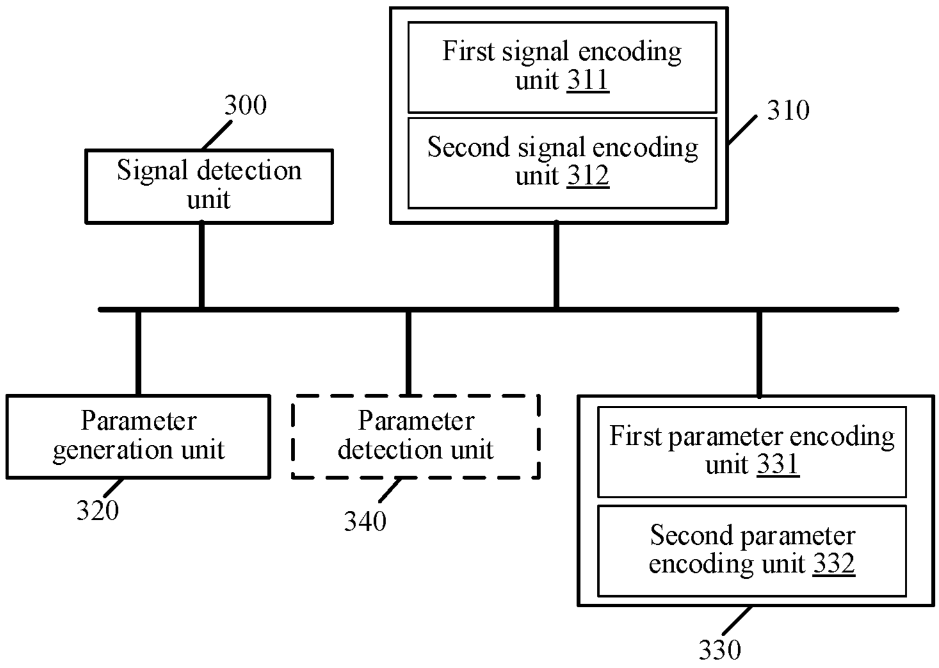

Optionally, based on FIG. 3A and FIG. 3B, as shown in FIG. 3C, the parameter generation unit 320 of the encoder includes a first parameter generation unit 321 and a second parameter generation unit 322. When the signal detection unit 300 detects that the N-iframe audio signals include the speech signal, or the signal detection unit 300 detects that the $N^{th}$-frame audio signals do not include the speech signal and the $N^{th}$-frame audio signals satisfy the preset speech frame encoding condition, the signal detection unit 300 instructs the first parameter generation unit 321 to generate the $N^{th}$-frame stereo parameter set. When the signal detection unit 300 detects that the $N^{th}$-frame audio signals do not include the speech signal, and the $N^{th}$-frame audio signals do not satisfy the preset speech frame encoding condition, the signal detection unit 300 instructs the second parameter generation unit 322 to generate the $N^{th}$-frame stereo parameter set. Further, it is pre-stipulated that the first parameter generation unit 321 obtains the $N^{th}$-frame stereo parameter set according to the $N^{th}$-frame audio signals based on a first stereo parameter set generation manner, and the second parameter generation unit 322 obtains the $N^{th}$-frame stereo parameter set according to the $N^{th}$-frame audio signals based on a second stereo parameter set generation manner.

The first stereo parameter set generation manner and the second stereo parameter set generation manner satisfy at least one of the following conditions.

A quantity that is of types of stereo parameters included in a stereo parameter set and that is stipulated in the first stereo parameter set generation manner is not less than a quantity that is of types of stereo parameters included in a stereo parameter set and that is stipulated in the second stereo parameter set generation manner, a quantity that is of stereo parameters included in a stereo parameter set and that is stipulated in the first stereo parameter set generation manner is not less than a quantity that is of stereo parameters included in a stereo parameter set and that is stipulated in the second stereo parameter set generation manner, time-domain resolution that is of a stereo parameter and that is stipulated in the first stereo parameter set generation manner is not lower than time-domain resolution that is of a corresponding stereo parameter and that is stipulated in the second stereo parameter set generation manner, or frequency-domain resolution that is of a stereo parameter and that is stipulated in the first stereo parameter set generation manner is not lower than frequency-domain resolution that is of a corresponding stereo parameter and that is stipulated in the second stereo parameter set generation manner.

After the second parameter generation unit 322 obtains the $N^{th}$-frame stereo parameter set, the parameter encoding unit 330 encodes the $N^{th}$-frame stereo parameter set. Further, as shown in FIG. 3), when the parameter encoding unit 330 includes a first parameter encoding unit 331 and a second parameter encoding unit 332, the first parameter encoding unit 331 encodes the $N^{th}$-frame stereo parameter set generated by the first parameter generation unit 321, and the second parameter encoding unit 332 encodes the $N^{th}$-frame stereo parameter set generated by the second parameter generation unit 322. It is pre-stipulated that an encoding manner of the first parameter encoding unit 331 is a first encoding manner, and it is pre-stipulated that an encoding manner of the second parameter encoding unit 332 is a second encoding manner. An encoding manner stipulated by the first parameter encoding unit 331 is the first encoding manner, and an encoding manner stipulated by the second parameter encoding unit 332 is the second encoding manner. Further, an encoding rate stipulated in the first encoding manner is not less than an encoding rate stipulated in the second encoding manner, and/or for any stereo parameter in the $N^{th}$-frame stereo parameter set, quantization precision stipulated in the first encoding manner is not lower than quantization precision stipulated in the second encoding manner.

The stereo parameter set is not encoded when the parameter detection unit 340 determines that the $N^{th}$-frame stereo parameter set does not satisfy the preset stereo parameter encoding condition.

Optionally, the parameter encoding unit 330 includes a first parameter encoding unit 331 and a second parameter encoding unit 332. Further, the first parameter encoding unit 331 is configured to encode the $N^{th}$-frame stereo parameter set according to a first encoding manner when the $N^{th}$-frame downmixed signal includes the speech signal and when the $N^{th}$-frame downmixed signal does not include the speech signal, but satisfies the speech frame encoding condition. The second parameter encoding unit 332 is configured to encode at least one stereo parameter in the $N^{th}$-frame stereo parameter set according to a second encoding manner when the $N^{th}$-frame downmixed signal does not satisfy the speech frame encoding condition.

An encoding rate stipulated in the first encoding manner is not less than an encoding rate stipulated in the second encoding manner, and/or for any stereo parameter in the $N^{th}$-frame stereo parameter set, quantization precision stipulated in the first encoding manner is not lower than quantization precision stipulated in the second encoding manner.

Optionally, if the at least one stereo parameter in the $N^{th}$-frame stereo parameter set includes an ILD, the preset stereo parameter encoding condition includes $D_L \geq D_0$, where $D_L$ represents a degree by which the ILD deviates from a first standard, the first standard is determined based on a predetermined second algorithm according to T-frame stereo parameter sets preceding the $N^{th}$-frame stereo parameter set, and T is a positive integer greater than 0.

If the at least one stereo parameter in the $N^{th}$-frame stereo parameter set includes an ITD, the preset stereo parameter encoding condition includes $D_T \geq D_1$, where $D_T$ represents a degree by which the ITD deviates from a second standard, the second standard is determined based on a predetermined third algorithm according to T-frame stereo parameter sets preceding the $N^{th}$-frame stereo parameter set, and T is a positive integer greater than 0.

If the at least one stereo parameter in the $N^{th}$-frame stereo parameter set includes an IPD, the preset stereo parameter encoding condition includes $D_P = D_2$, where $D_P$ represents a degree by which the IPD deviates from a third standard, the third standard is determined based on a predetermined fourth algorithm according to T-frame stereo parameter sets preceding the $N^{th}$-frame stereo parameter set, and T is a positive integer greater than 0.

Optionally, $D_L$, $D_T$, and $D_P$ respectively satisfy the following expressions:

$$D_L = \sum_{m=0}^{M-1}\left|ILD(m) - \frac{1}{T}\sum_{t=1}^{T} ILD^{[-t]}(m)\right|;$$

$$D_T = ITD - \frac{1}{T}\sum_{t=1}^{T} ITD^{[-t]}(m);\text{ and}$$

$$D_P \sum_{m=0}^{M-1}\left|IPD(m) - \frac{1}{T}\sum_{t=1}^{T} IPD^{[-t]}(m)\right|,$$

where ILD(m) is a level difference generated when the $N^{th}$-frame audio signals are respectively transmitted on the two channels in an $m^{th}$ sub frequency band, M is a total quantity of sub frequency bands occupied for transmitting the $N^{th}$-frame audio signals $$\frac{1}{T}\sum_{t=1}^{T} ILD^{[-t]}(m)$$

is an average value of ILDs in the T-frame stereo parameter sets preceding the $N^{th}$-frame stereo parameter set in the $m^{th}$ sub frequency band, T is a positive integer greater than 0, $ILD^{[-t]}(m)$ is a level difference generated when $t^{th}$-frame audio signals preceding the $N^{th}$-frame audio signals are respectively transmitted on the two channels in the $m^{th}$ sub frequency band, the ITD is a time difference generated when the $N^{th}$-frame audio signals are respectively transmitted on the two channels $$\frac{1}{T}\sum_{t=1}^{T} ITD^{[-t]}$$

is an average value of ITDs in the T-frame stereo parameter sets preceding the $N^{th}$-frame stereo parameter set, $ITD^{[-t]}$ is a time difference generated when the $t^{th}$-frame audio signals preceding the $N^{th}$-frame audio signals are respectively transmitted on the two channels, IPD(m) is a phase difference generated when some of the $N^{th}$-frame audio signals are respectively transmitted on the two channels in the $m^{th}$ sub frequency band $$\frac{1}{T}\sum_{t=1}^{T} IPD^{[-t]}(m)$$

is an average value of IPDs in the T-frame stereo parameter sets preceding the $N^{th}$-frame stereo parameter set in the $m^{th}$ sub frequency band, and $IPD^{[-t]}(m)$ is a phase difference generated when the $t^{th}$-frame audio signals preceding the $N^{th}$-frame audio signals are respectively transmitted on the two channels in the $m^{th}$ sub frequency band.

It should be noted that the parameter detection unit 340 in FIG. 3A to FIG. 3D is optional. That is, the encoder may include the parameter detection unit 340 or may not include the parameter detection unit 340.

When the parameter encoding unit 330 encodes each frame of stereo parameter set of the parameter generation unit 320, the stereo parameter does not need to be detected, but is directly encoded.

Figure 4:
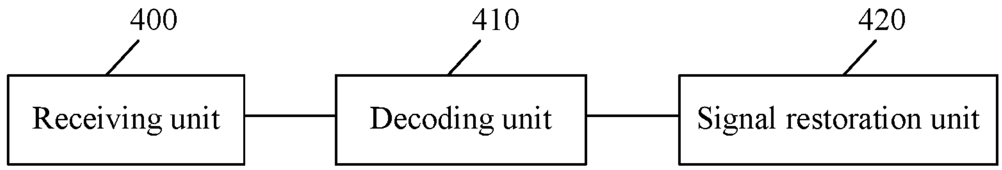
FIG. 4 is a schematic diagram of a decoder according to an embodiment of the present disclosure.

As shown in FIG. 4, a decoder in an embodiment of the present disclosure includes a receiving unit 400 and a decoding unit 410. The receiving unit 400 is configured to receive a bitstream. The bitstream includes at least two frames, the at least two frames include at least one first-type frame and at least one second-type frame, the first-type frame includes a downmixed signal, and the second-type frame does not include a downmixed signal. For an $N^{th}$-frame bitstream, where N is a positive integer greater than 1, the decoding unit 410 is configured to, if the $N^{th}$-frame bitstream is the first-type frame, decode the $N^{th}$-frame bitstream, to obtain an $N^{th}$-frame downmixed signal, or if the $N^{th}$-frame bitstream is the second-type frame, determine, according to a preset first rule, m-frame downmixed signals in at least one-frame downmixed signal preceding an $N^{th}$-frame downmixed signal, and obtain the $N^{th}$-frame downmixed signal according to the m-frame downmixed signals based on a predetermined first algorithm, m is a positive integer greater than 0.

The $N^{th}$-frame downmixed signal is obtained by an encoder by mixing $N^{th}$-frame audio signals on two of multiple channels based on a predetermined second algorithm.

Optionally, as shown in FIG. 4, the decoder further includes a signal restoration unit 420. The first-type frame includes both a downmixed signal and a stereo parameter set, and the second-type frame includes a stereo parameter set, but does not include a downmixed signal.

If the $N^{th}$-frame bitstream is the first-type frame, the decoding unit 410 decodes the $N^{th}$-frame bitstream, to obtain both the $N^{th}$-frame downmixed signal and an $N^{th}$-frame stereo parameter set, or if the $N^{th}$-frame bitstream is the second-type frame, the decoding unit 410 decodes the $N^{th}$-frame bitstream to obtain an $N^{th}$-frame stereo parameter set. At least one stereo parameter in the $N^{th}$-frame stereo parameter set is used by the decoder to restore the $N^{th}$-frame downmixed signal to the $N^{th}$-frame audio signals based on a predetermined third algorithm.

The signal restoration unit 420 is configured to restore the $N^{th}$-frame downmixed signal to the $N^{th}$-frame audio signals according to the at least one stereo parameter in the $N^{th}$-frame stereo parameter set based on the third algorithm.

Optionally, the first-type frame includes both a downmixed signal and a stereo parameter set, and the second-type frame includes neither a stereo parameter set nor a downmixed signal.

The decoding unit 410 is further configured to, if the $N^{th}$-frame bitstream is the first-type frame, decode the $N^{th}$-frame bitstream, to obtain both the $N^{th}$-frame downmixed signal and an $N^{th}$-frame stereo parameter set, or if the $N^{th}$-frame bitstream is the second-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, k is a positive integer greater than 0.

At least one stereo parameter in the $N^{th}$-frame stereo parameter set is used by the decoder to restore the $N^{th}$-frame downmixed signal to the $N^{th}$-frame audio signals based on a predetermined third algorithm.

A signal restoration unit 420 is configured to restore the $N^{th}$-frame downmixed signal to the $N^{th}$-frame audio signals according to the at least one stereo parameter in the $N^{th}$-frame stereo parameter set based on the third algorithm.

Optionally, the first-type frame includes both a downmixed signal and a stereo parameter set, a third-type frame includes a stereo parameter set, but does not include a downmixed signal, a fourth-type frame includes neither a downmixed signal nor a stereo parameter set, and each of the third-type frame and the fourth-type frame is one ease of the second-type frame.

The decoding unit 410 is further configured to, if the $N^{th}$-frame bitstream is the first-type frame, decode the $N^{th}$-frame bitstream, to obtain both the $N^{th}$-frame downmixed signal and an $N^{th}$-frame stereo parameter set, or if the $N^{th}$-frame bitstream is the second-type frame, when the $N^{th}$-frame bitstream is the third-type frame, decode the $N^{th}$-frame bitstream, to obtain an $N^{th}$-frame stereo parameter set, or when the $N^{th}$-frame bitstream is the fourth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm, where k is a positive integer greater than 0.

At least one stereo parameter in the $N^{th}$-frame stereo parameter set is used by the decoder to restore the $N^{th}$-frame downmixed signal to the $N^{th}$-frame audio signals based on a predetermined third algorithm.

A signal restoration unit 420 is configured to restore the $N^{th}$-frame downmixed signal to the $N^{th}$-frame audio signals according to the at least one stereo parameter in the $N^{th}$-frame stereo parameter set based on the third algorithm.

Optionally, a fifth-type frame includes both a downmixed signal and a stereo parameter set, a sixth-type frame includes a downmixed signal, but does not include a stereo parameter set, each of the fifth-type frame and the sixth-type frame is one case of the first-type frame, and the second-type frame includes neither a downmixed signal nor a stereo parameter set.

The decoding unit 410 is further configured to, if the $N^{th}$-frame bitstream is the first-type frame, when the $N^{th}$-frame bitstream is the fifth-type frame, decode the $N^{th}$-frame bitstream to obtain both the $N^{th}$-frame downmixed signal and an $N^{th}$-frame stereo parameter set, or when the $N^{th}$-frame bitstream is the sixth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm.

The decoding unit 410 is further configured to, if the $N^{th}$-frame bitstream is the second-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm.

At least one stereo parameter in the $N^{th}$-frame stereo parameter set is used by the decoder to restore the $N^{th}$-frame downmixed signal to the $N^{th}$-frame audio signals based on a predetermined third algorithm, and k is a positive integer greater than 0.

A signal restoration unit 420 is configured to restore the $N^{th}$-frame downmixed signal to the $N^{th}$-frame audio signals according to the at least one stereo parameter in the $N^{th}$-frame stereo parameter set based on the third algorithm.

Optionally, a fifth-type frame includes both a downmixed signal and a stereo parameter set, a sixth-type frame includes a downmixed signal, but does not include a stereo parameter set, each of the fifth-type frame and the sixth-type frame is one case of the first-type frame, a third-type frame includes a stereo parameter set, but does not include a downmixed signal, a fourth-type frame includes neither a downmixed signal nor a stereo parameter set, and each of the third-type frame and the fourth-type frame is one case of the second-type frame.

The decoding unit 410 is further configured to, if the $N^{th}$-frame bitstream is the first-type frame, when the $N^{th}$-frame bitstream is the fifth-type frame, decode the $N^{th}$-frame bitstream to obtain both the $N^{th}$-frame downmixed signal and an $N^{th}$-frame stereo parameter set, or when the $N^{th}$-frame bitstream is the sixth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm.

The decoding unit 410 is further configured to, if the $N^{th}$-frame bitstream is the second-type frame, when the $N^{th}$-frame bitstream is the third-type frame, decode the $N^{th}$-frame bitstream to obtain an $N^{th}$-frame stereo parameter set, or when the $N^{th}$-frame bitstream is the fourth-type frame, determine, according to a preset second rule, k-frame stereo parameter sets in at least one-frame stereo parameter set preceding an $N^{th}$-frame stereo parameter set, and obtain the $N^{th}$-frame stereo parameter set according to the k-frame stereo parameter sets based on a predetermined fourth algorithm.

At least one stereo parameter in the $N^{th}$-frame stereo parameter set is used by the decoder to restore the $N^{th}$-frame downmixed signal to the $N^{th}$-frame audio signals based on a predetermined third algorithm, and k is a positive integer greater than 0.

A signal restoration unit 420 is configured to restore the $N^{th}$-frame downmixed signal to the $N^{th}$-frame audio signals according to the at least one stereo parameter in the $N^{th}$-frame stereo parameter set based on the third algorithm.

Figure 5:
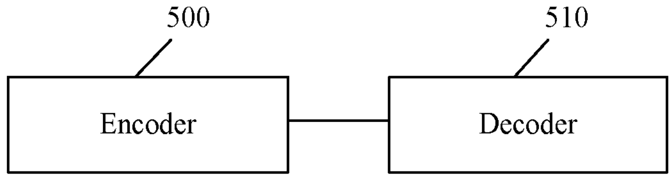
FIG. 5 is a schematic diagram of an encoding and decoding system according to an embodiment of the present disclosure.

As shown in FIG. 5, an embodiment of the present disclosure provides an encoding and decoding system, including any encoder 500 shown in FIG. 3A and FIG. 3B and the decoder 510 shown in FIG. 4.

Figure 6:
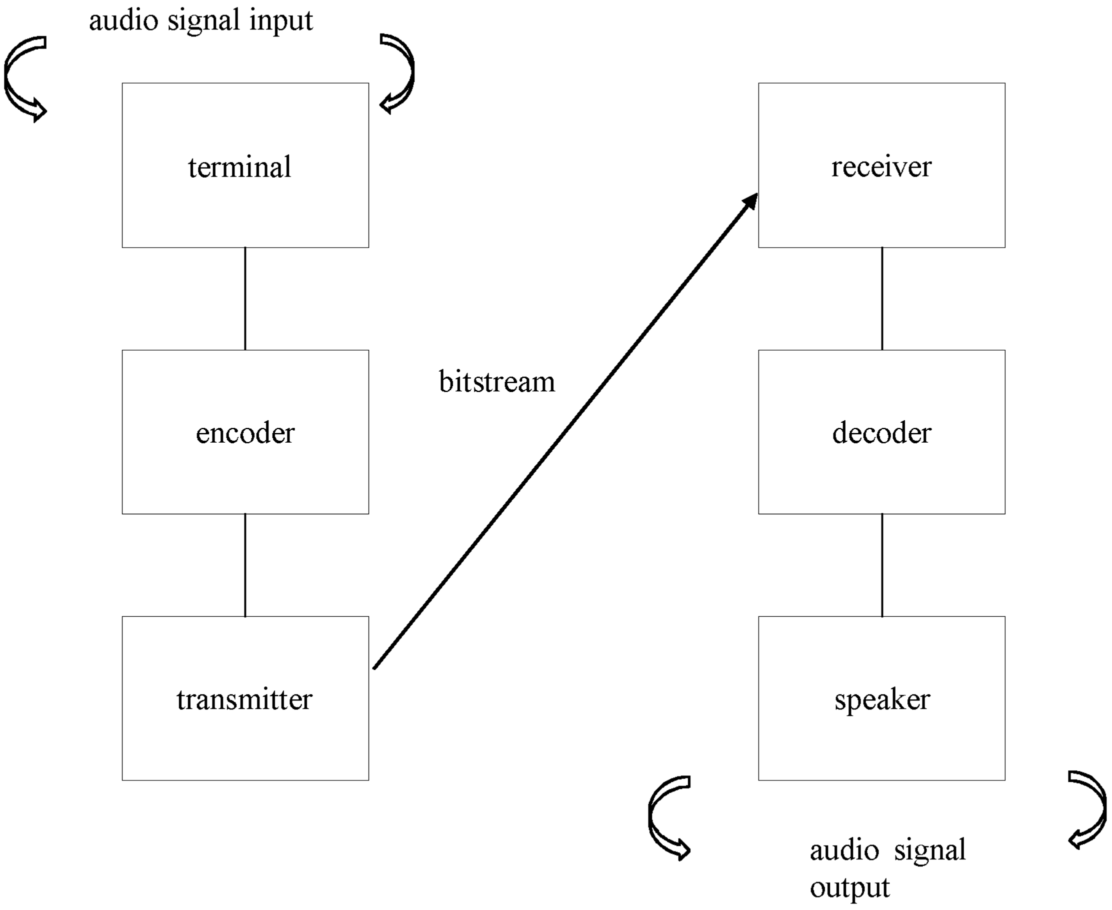
FIG. 6 is a schematic diagram of systems and devices according to embodiments of the present disclosure.

FIG. 6 depicts embodiments of systems and devices according to the present disclosure. A microphone is configured to receive audio signal inputs. The microphone is coupled with an encoder configured to process the audio signal and generate a bitstream The encoder is in turn coupled to a transmitter capable of transmitting the bitstream. A receiver is configured to receive a bitstream and to pass the bitstream to a decoder coupled with the receiver. The decoder is configured to receive and process the bitstream. The decoder is in turn coupled with a speaker configured to output, based on the bitstream, an audio signal.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and implement a combination of a process and/or a block in the flowcharts and/or the block diagrams. These computer program instructions may be provided for a general-purpose computer, a dedicated computer, an embedded processor, or a processor of another programmable data processing device to generate a machine such that the instructions executed by the computer or the processor of the other programmable data processing device generate an apparatus for implementing a specific function in one or more processes in the flowcharts and/or in one or more blocks in the block diagrams.

These computer program instructions may be stored in a computer readable memory that can instruct the computer or the other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the other programmable data processing device such that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

The invention claimed is:

1. A terminal configured to obtain a multi-channel audio signal, comprising:

an encoder comprising a predetermined first algorithm and configured to:

mix $N^{th}$-frame audio signals of two of a plurality of channels of the multi-channel audio signal, based on the first algorithm to obtain an $N^{th}$-frame downmixed signal, wherein N is a positive integer greater than zero;

detect whether the $N^{th}$-frame downmixed signal comprises a speech signal; and when no speech signal is detected, encode the $N^{th}$-frame downmixed signal into a bitstream when the $N^{th}$-frame downmixed signal satisfies a preset audio frame encoding condition; and a transmitter coupled to the encoder and configured to transmit the bitstream.

2. The terminal of claim 1, wherein the encoder is further configured to:

encode the $N^{th}$-frame downmixed signal according to a preset speech frame encoding rate when a speech signal is detected;

encode the $N^{th}$-frame downmixed signal into the bitstream according to the preset speech frame encoding rate when the $N^{th}$-frame downmixed signal satisfies a preset speech frame encoding condition; and encode the $N^{th}$-frame downmixed signal into the bitstream according to a preset silence insertion descriptor (SID) frame encoding rate when the $N^{th}$-frame downmixed signal does not satisfy the preset speech frame encoding condition and satisfies a preset SID encoding condition, wherein the preset SID frame encoding rate is less than or equal to the preset speech frame encoding rate.

3. The terminal of claim 2, wherein the encoder is further configured to:

obtain an $N^{th}$-frame stereo parameter set according to the $N^{th}$-frame audio signals based on a first stereo parameter set generation manner, and encode the $N^{th}$-frame stereo parameter set when a speech signal is detected;

when no speech signal is detected and when the $N^{th}$-frame audio signals satisfies the preset speech frame encoding condition, obtain the $N^{th}$-frame stereo parameter set according to the $N^{th}$-frame audio signals based on the first stereo parameter set generation manner, and encode the $N^{th}$-frame stereo parameter set;

when no speech signal is detected and when the $N^{th}$-frame audio signals do not satisfy the preset speech frame encoding condition, obtain the $N^{th}$-frame stereo parameter set according to the $N^{th}$-frame audio signals based on a second stereo parameter set generation manner; and encode a stereo parameter in the $N^{th}$-frame stereo parameter set when the $N^{th}$-frame stereo parameter set satisfies a preset stereo parameter encoding condition, wherein the first stereo parameter set generation manner and the second stereo parameter set generation manner satisfy one of the following conditions:

a quantity of types of stereo parameters comprised in a stereo parameter set stipulated in the first stereo parameter set generation manner is greater than or equal to a quantity of types of stereo parameters comprised in a stereo parameter set stipulated in the second stereo parameter set generation manner, a quantity of stereo parameters comprised in the stereo parameter set stipulated in the first stereo parameter set generation manner is greater than or equal to a quantity of stereo parameters comprised in the stereo parameter set stipulated in the second stereo parameter set generation manner, a time-domain resolution of a stereo parameter stipulated in the first stereo parameter set generation manner is higher than or equal to a time-domain resolution of a corresponding stereo parameter stipulated in the second stereo parameter set generation manner, or a frequency-domain resolution of a stereo parameter stipulated in the first stereo parameter set generation manner is higher than or equal to a frequency-domain resolution of a corresponding stereo parameter stipulated in the second stereo parameter set generation manner.

4. The terminal of claim 1, wherein the encoder is further configured to:

obtain an $N^{th}$-frame stereo parameter set according to the $N^{th}$-frame audio signals, wherein the $N^{th}$-frame stereo parameter set comprises Z stereo parameters, wherein the Z stereo parameters comprise a parameter used to mix the $N^{th}$-frame audio signals, and wherein Z is a positive integer greater than zero;

encode the $N^{th}$-frame stereo parameter set when a speech signal is detected; and when no speech signal is detected, encode a stereo parameter in the $N^{th}$-frame stereo parameter set when the $N^{th}$-frame stereo parameter set satisfies a preset stereo parameter encoding condition.

5. The terminal of claim 4, wherein the encoder is further configured to:

obtain X target stereo parameters according to the Z stereo parameters in the $N^{th}$-frame stereo parameter set based on a preset stereo parameter dimension reduction rule, wherein X is a positive integer greater than zero and less than or equal to Z; and encode the X target stereo parameters.

6. The terminal of claim 4, wherein the encoder is further configured to:

encode the stereo parameter according to a first encoding manner when the $N^{th}$-frame downmixed signal satisfies a speech frame encoding condition; and encode the stereo parameter according to a second encoding manner when the $N^{th}$-frame downmixed signal does not satisfy the speech frame encoding condition, wherein an encoding rate stipulated in the first encoding manner is greater than or equal to an encoding rate stipulated in the second encoding manner, or wherein a quantization precision stipulated in the first encoding manner is higher than or equal to a quantization precision stipulated in the second encoding manner for any stereo parameter in the $N^{th}$-frame stereo parameter set.

7. The terminal of claim 4, wherein the encoder is further configured to:

determine that the preset stereo parameter encoding condition comprises $D_L \geq D_0$ when the stereo parameter comprises an inter-channel level difference (ILD), wherein $D_L$ represents a degree by which the ILD deviates from a first standard, wherein the first standard is based on a predetermined second algorithm according to T-frame stereo parameter sets preceding the $N^{th}$-frame stereo parameter set, and wherein T is a positive integer greater than zero;

determine that the preset stereo parameter encoding condition comprises $D_T \geq D_1$ when the stereo parameter comprises an inter-channel time difference (ITD), wherein $D_T$ represents a degree by which the ITD deviates from a second standard, and wherein the second standard is based on a predetermined third algorithm according to the T-frame stereo parameter sets; and determine that the stereo parameter comprises an inter-channel phase difference (IPD), wherein the preset stereo parameter encoding condition comprises $D_P \geq D_2$, wherein $D_P$ represents a degree by which the IPD deviates from a third standard, and wherein the third standard is based on a predetermined fourth algorithm according to the T-frame stereo parameter sets.

8. The terminal of claim 7, wherein $D_L$, $D_T$, and $D_P$ are based on a level difference generated when the $N^{th}$-frame audio signals are respectively transmitted on two channels in an $m^{th}$ sub frequency band, an average value of ILDs in the T-frame stereo parameter sets preceding the $N^{th}$-frame stereo parameter set in the $m^{th}$ sub frequency band, a second level difference generated when $t^{th}$-frame audio signals preceding the $N^{th}$-frame audio signals are respectively transmitted on the two channels in the $m^{th}$ sub frequency band, an average value of ITDs in the T-frame stereo parameter sets that are respectively transmitted on the two channels, an average value of IPDs in the T-frame stereo parameter sets preceding the $N^{th}$-frame stereo parameter set in the $m^{th}$ sub frequency band, a first phase difference generated when the $N^{th}$-frame audio signals are respectively transmitted on the two channels in the $m^{th}$ sub frequency band, and a second phase difference generated when the $t^{th}$-frame audio signals are respectively transmitted on the two channels in the $m^{th}$ sub frequency band, wherein M is a total quantity of sub frequency bands occupied for transmitting the $N^{th}$-frame audio signals, and wherein the ITD is a first time difference generated when the $N^{th}$-frame audio signals are respectively transmitted on the two channels.

9. A device, comprising:

a receiver;

a decoder coupled to the receiver and configured to:

receive an $N^{th}$-frame bitstream, wherein N is a positive integer greater than zero, comprising at least two frames, wherein the at least two frames comprise at least one first-type frame comprising a downmixed signal and at least one second-type frame, wherein the second-type frame does not comprise a downmixed signal; and for the $N^{th}$-frame bitstream:

decode the first type frame to obtain an $N^{th}$-frame downmixed signal; and when the $N^{th}$-frame bitstream is the second-type frame:

determine, according to a preset first rule, m-frame downmixed signals in at least one-frame downmixed signal preceding an $N^{th}$-frame downmixed signal; and obtain the $N^{th}$-frame downmixed signal according to the m-frame downmixed signals based on a predetermined first algorithm, wherein m is a positive integer greater than zero, and wherein N is a positive integer greater than one; and at least one speaker coupled to the decoder and configured to output, based on the bitstream, an audio signal.

10. The device of claim 9, wherein the first-type frame comprises a downmixed signal and a stereo parameter set, wherein the second-type frame comprises the stereo parameter set and does not comprise a downmixed signal, and wherein the decoder is further configured to:

obtain an $N^{th}$-frame stereo parameter set after the decoder decodes the $N^{th}$-frame bitstream and when the $N^{th}$-frame bitstream is the first-type frame;

decode the $N^{th}$-frame bitstream to obtain the $N^{th}$-frame stereo parameter set when the $N^{th}$-frame bitstream is the second-type frame; and restore, based on a predetermined third algorithm, the $N^{th}$-frame downmixed signal to $N^{th}$-frame audio signals using a stereo parameter in the $N^{th}$-frame stereo parameter set.

11. The device of claim 9, wherein the first-type frame comprises a downmixed signal and a stereo parameter set, wherein the second-type frame comprises neither the downmixed signal nor the stereo parameter set, and wherein the decoder is further configured to:

obtain an $N^{th}$-frame stereo parameter set after the decoder decodes the $N^{th}$-frame bitstream and when the $N^{th}$-frame bitstream is the first-type frame;

after the decoder determines that the $N^{th}$-frame bitstream is the second-type frame:

determine, according to a preset second rule, k-frame stereo parameter sets in at least one-frame stereo parameter set preceding an $N^{th}$-frame stereo parameter set; and obtain the $N^{th}$-frame stereo parameter set according to the k-frame stereo parameter sets based on a predetermined fourth algorithm, wherein k is a positive integer greater than zero; and restore, based on a predetermined third algorithm, the $N^{th}$-frame downmixed signal to $N^{th}$-frame audio signals using a stereo parameter in the $N^{th}$-frame stereo parameter set.

12. The device of claim 9, wherein the first-type frame comprises a downmixed signal and a stereo parameter set, wherein a third-type frame comprises the stereo parameter set and does not comprise the downmixed signal, wherein a fourth-type frame comprises neither the downmixed signal nor the stereo parameter set, wherein each of the third-type frame and the fourth-type frame is one case of the second-type frame, and wherein the decoder is further configured to:

obtain an $N^{th}$-frame stereo parameter set after the decoder decodes the $N^{th}$-frame bitstream and when the $N^{th}$-frame bitstream is the first-type frame;

after the decoder determines that the $N^{th}$-frame bitstream is the second-type frame:

decode the $N^{th}$-frame bitstream to obtain an $N^{th}$-frame stereo parameter set when the $N^{th}$-frame bitstream is the third-type frame; and when the $N^{th}$-frame bitstream is the fourth-type frame:

determine, according to a preset second rule, k-frame stereo parameter sets in at least one-frame stereo parameter set preceding an $N^{th}$-frame stereo parameter set; and obtain the $N^{th}$-frame stereo parameter set according to the k-frame stereo parameter sets based on a predetermined fourth algorithm, wherein k is a positive integer greater than zero; and restore, based on at least one preset algorithm, the $N^{th}$-frame downmixed signal to $N^{th}$-frame audio signals; and restore, based on a predetermined third algorithm, the $N^{th}$-frame downmixed signal to the $N^{th}$-frame audio signals using a stereo parameter in the $N^{th}$-frame stereo parameter set.

13. The device of claim 9, wherein a fifth-type frame comprises a downmixed signal and a stereo parameter set, wherein a sixth-type frame comprises the downmixed signal and does not comprise the stereo parameter set, wherein each of the fifth-type frame and the sixth-type frame is one case of the first-type frame, wherein the second-type frame comprises neither the downmixed signal nor the stereo parameter set, and wherein the decoder is further configured to:

after the decoder determines that the $N^{th}$-frame bitstream is the first-type frame:

decode the $N^{th}$-frame bitstream to obtain an $N^{th}$-frame stereo parameter set when the $N^{th}$-frame bitstream is the fifth-type frame; and when the $N^{th}$-frame bitstream is the sixth-type frame:

determine, according to a preset second rule, k-frame stereo parameter sets in at least one-frame stereo parameter set preceding an $N^{th}$-frame stereo parameter set; and obtain the $N^{th}$-frame stereo parameter set according to the k-frame stereo parameter sets based on a predetermined fourth algorithm; and after the decoder determines that the $N^{th}$-frame bitstream is the second-type frame:

determine, according to a preset second rule, the k-frame stereo parameter sets; and obtain the $N^{th}$-frame stereo parameter set according to the k-frame stereo parameter sets based on the predetermined fourth algorithm, wherein k is a positive integer greater than zero; and restore, based on a predetermined third algorithm, the $N^{th}$-frame downmixed signal to $N^{th}$-frame audio signals using a stereo parameter in the $N^{th}$-frame stereo parameter set.

14. The device of claim 9, wherein a fifth-type frame comprises a downmixed signal and a stereo parameter set, wherein a sixth-type frame comprises the downmixed signal and does not comprise the stereo parameter set, wherein each of the fifth-type frame and the sixth-type frame is one case of the first-type frame, wherein a third-type frame comprises the stereo parameter set and does not comprise the downmixed signal, wherein a fourth-type frame comprises neither the downmixed signal nor the stereo parameter set, wherein each of the third-type frame and the fourth-type frame is one case of the second-type frame, and wherein the decoder is further configured to:

after the decoder determines that the $N^{th}$-frame bitstream is the first-type frame:

decode the $N^{th}$-frame bitstream to obtain an $N^{th}$-frame stereo parameter set when the $N^{th}$-frame bitstream is the fifth-type frame; and when the $N^{th}$-frame bitstream is the sixth-type frame: determine, according to a preset second rule, k-frame stereo parameter sets in at least one-frame stereo parameter set preceding an $N^{th}$-frame stereo parameter set; and obtain the $N^{th}$-frame stereo parameter set according to the k-frame stereo parameter sets based on a predetermined fourth algorithm;

after the decoder determines that the $N^{th}$-frame bitstream is the second-type frame:

decode the $N^{th}$-frame bitstream to obtain an $N^{th}$-frame stereo parameter set when the $N^{th}$-frame bitstream is the third-type frame; and when the $N^{th}$-frame bitstream is the fourth-type frame: determine, according to the preset second rule, the k-frame stereo parameter sets in the at least one-frame stereo parameter set; and obtain the $N^{th}$-frame stereo parameter set according to the k-frame stereo parameter sets based on the predetermined fourth algorithm, wherein k is a positive integer greater than zero; and restore, based on a predetermined third algorithm, the $N^{th}$-frame downmixed signal to $N^{th}$-frame audio signals using a stereo parameter in the $N^{th}$-frame stereo parameter set.

15. A computer program product comprising computer-executable instructions for storage on a non-transitory computer-readable medium that, when executed by one or more processors of an encoder, cause the one or more processors to:

mix $N^{th}$-frame audio signals on two of a plurality of channels based on a predetermined first algorithm to obtain an $N^{th}$-frame downmixed signal, wherein N is a positive integer greater than zero;

detect whether the $N^{th}$-frame downmixed signal comprises a speech signal; and when no speech signal is detected, encode the $N^{th}$-frame downmixed signal into a bitstream when the $N^{th}$-frame downmixed signal satisfies a preset audio frame encoding condition.

16. The computer program product of claim 15, wherein the computer-executable instructions further cause the one or more processors to encode the $N^{th}$-frame downmixed signal into the bitstream according to a preset speech frame encoding rate when a speech signal is detected.

17. The computer program product of claim 16, wherein the computer-executable instructions further cause the one or more processors to encode the $N^{th}$-frame downmixed signal into the bitstream according to a preset speech frame encoding rate, wherein the $N^{th}$-frame downmixed signal satisfies a preset speech frame encoding condition.

18. The computer program product of claim 15, wherein the computer-executable instructions further cause the one or more processors to encode the $N^{th}$-frame downmixed signal into the bitstream according to a preset silence insertion descriptor (SID) frame encoding rate, wherein the $N^{th}$-frame downmixed signal does not satisfy a preset speech frame encoding condition and satisfies a preset SID encoding condition, and wherein the preset SID frame encoding rate is less than or equal to a preset speech frame encoding rate.

19. The computer program product of claim 15, wherein the computer-executable instructions further cause the one or more processors to:

obtain an $N^{th}$-frame stereo parameter set according to the $N^{th}$-frame audio signals, wherein the $N^{th}$-frame stereo parameter set comprises Z stereo parameters, wherein the Z stereo parameters comprise a parameter used to mix the $N^{th}$-frame audio signals, and wherein Z is a positive integer greater than zero; and encode the $N^{th}$-frame stereo parameter set when a speech signal is detected.

20. The computer program product of claim 15, wherein the computer-executable instructions further cause the one or more processors to:

obtain an $N^{th}$-frame stereo parameter set according to the $N^{th}$-frame audio signals, wherein the $N^{th}$-frame stereo parameter set comprises Z stereo parameters, wherein the Z stereo parameters comprise a parameter used to mix the $N^{th}$-frame audio signals, and wherein Z is a positive integer greater than zero; and encode a stereo parameter in the $N^{th}$-frame stereo parameter set when the $N^{th}$-frame stereo parameter set satisfies a preset stereo parameter encoding condition.

* * * * *